US011681187B2

United States Patent
Sugimoto et al.

(10) Patent No.: US 11,681,187 B2
(45) Date of Patent: Jun. 20, 2023

(54) ELECTRO-OPTICAL DEVICE AND ELECTRONIC DEVICE

(71) Applicant: SEIKO EPSON CORPORATION, Tokyo (JP)

(72) Inventors: Yohei Sugimoto, Fujimi-Machi (JP); Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 6 days.

(21) Appl. No.: 17/386,587

(22) Filed: Jul. 28, 2021

(65) Prior Publication Data

US 2022/0035209 A1 Feb. 3, 2022

(30) Foreign Application Priority Data

Jul. 28, 2020 (JP) .............................. JP2020-127095

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/136213* (2013.01); *G02F 1/136286* (2013.01)

(58) Field of Classification Search
CPC ......... G02F 1/136209; G02F 1/136213; G02F 1/136286; G02F 1/1368; G02F 1/13629; G02F 1/13685

USPC ......................................................... 349/147
See application file for complete search history.

(56) References Cited

U.S. PATENT DOCUMENTS

2011/0073868 A1* 3/2011 Nakagawa ............ H01L 27/124
257/E33.053
2019/0121209 A1* 4/2019 Izawa ................ G02F 1/133345

FOREIGN PATENT DOCUMENTS

| JP | H01-321540 | 12/1989 |
| JP | H02-002521 | 1/1990 |
| JP | H03-182723 | 8/1991 |
| JP | 2005-202337 | 7/2005 |

* cited by examiner

*Primary Examiner* — Edward J Glick
*Assistant Examiner* — David Y Chung
(74) *Attorney, Agent, or Firm* — JCIPRNET

(57) ABSTRACT

An electro-optical device including a first substrate and a transistor is provided. The first substrate includes a first scanning line having a light shielding property and extending in a first direction between a substrate body and a pixel electrode. The transistor includes a semiconductor film extending in the first direction to overlap with the first scanning line in a layer between the first scanning line and the pixel electrode. In a layer between a gate electrode and a pixel electrode, a second scanning line having a light shielding property extends in the first direction to overlap with the first scanning line in plan view. The second scanning line extends through a position spaced apart from a third contact portion that electrically couples the pixel electrode and the semiconductor film, and is electrically coupled to the gate electrode and the first scanning line.

19 Claims, 18 Drawing Sheets

ELECTRO-OPTICAL DEVICE AND ELECTRONIC DEVICE

The present application is based on, and claims priority from JP Application Serial Number 2020-127095, filed on Jul. 28, 2020, the disclosure of which is hereby incorporated by reference herein in its entirety.

BACKGROUND

1. Technical Field

The present disclosure relates to an electro-optical device including a scanning line electrically coupled to a transistor, and also relates to an electronic device.

2. Related Art

An electro-optical device is used as a light valve or the like of a projection-type display device. In the electro-optical device, a plurality of transistors are controlled using a scanning signal supplied from a scanning line to control writing of image signals from a data line to a pixel electrode. This results in a plurality of transistors being electrically coupled to a single scanning line. Thus, in order to achieve the electro-optical device having high resolution or the like, it is necessary to reduce the time constant in the scanning line. To this end, it is effective to make wiring lines multi-layered to reduce the resistance of the scanning line. For example, a scanning line at the lower layer side than a semiconductor film and a scanning line at the upper layer side than the semiconductor film are layered with an insulating film being interposed therebetween, and the scanning line at the lower layer side and the scanning line at the upper layer side are electrically coupled to each other through a contact hole provided in the insulating film (see, JP-A-1-321540).

With the configuration described in JP-A-1-321540, the semiconductor film extending in the same direction as the scanning line is formed so as not to overlap with the scanning line in plan view. This makes it difficult to use the scanning line to block the entrance of light into the semiconductor film, this entrance causing optical leakage current. On the other hand, when the semiconductor film is provided between the scanning line at the lower layer side and the scanning line at the upper layer side, it is difficult to electrically couple the semiconductor film and the data line or electrically couple the semiconductor film and a pixel electrode. Thus, the structure described in JP-A-1-321540 has a problem in that it is difficult for this structure to achieve multilayering of scanning lines and suppression of optical leakage current.

SUMMARY

In order to solve the problem described above, one aspect of an electro-optical device according to the present disclosure includes a substrate body, a pixel electrode, a first scanning line having a light shielding property and extending in a first direction in a layer between the substrate body and the pixel electrode, a transistor including a semiconductor film and a gate electrode, the semiconductor film extending in the first direction so as to overlap, in plan view, with the first scanning line in a layer between the first scanning line and the pixel electrode, the gate electrode overlapping with the semiconductor film from a side of the pixel electrode with a gate insulating film being interposed between the gate electrode and the semiconductor film, a data line extending in a second direction intersecting the first direction in a layer between the gate electrode and the pixel electrode, a first contact portion overlapping with the gate electrode in plan view, a second contact portion overlapping with the first scanning line in plan view and including a portion extending along the semiconductor film in the first direction, the portion extending at a side of the semiconductor film, a third contact portion that electrically couples the semiconductor film and one of the data line and the pixel electrode at a position that overlaps with the first scanning line in plan view, and a second scanning line having a light shielding property, the second scanning line extending, in the first direction, through a position spaced apart from the third contact portion in the second direction in a layer between the gate electrode and the pixel electrode, the second scan line overlapping with the first scanning line in plan view, the second scanning line being electrically coupled to the gate electrode at the first contact portion, the second scan line being electrically coupled to the first scanning line at the second contact portion.

The electro-optical device to which the present disclosure is applied is used for various types of electronic devices. In this disclosure, when the electronic device is a projection-type display device, the projection-type display device includes a light source unit that outputs light to be supplied to the electro-optical device, and also includes a projection optical system configured to project light modulated by the electro-optical device.

DESCRIPTION OF EXEMPLARY EMBODIMENTS

Figure 1:
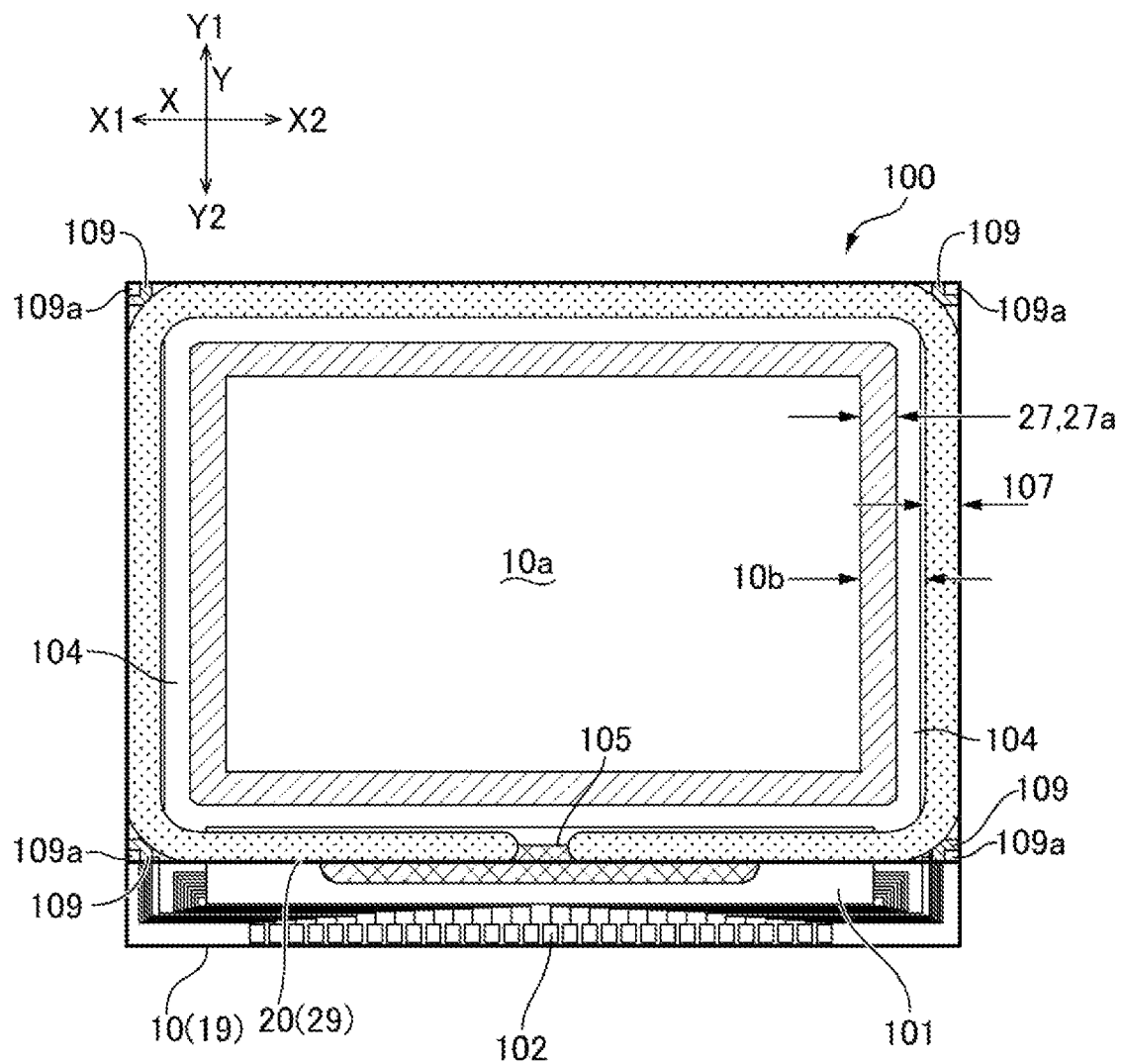
FIG. 1 is a plan view of an electro-optical device according to a first embodiment of the present disclosure.

Embodiments according to the present disclosure will be described with reference to the drawings. Note that, in the drawings referred to during the following description, individual layers or individual members are illustrated on various scales so that these layers or members have a size that allows them to be recognized on the drawings. In addition, in the following description, when individual layers formed at a first substrate 10 are described, an upper layer side or a front surface side means a side at which an electro-optical layer 80 is positioned, whereas a lower layer side means a side at which a substrate body 19 is positioned. Furthermore, of two directions intersecting each other in in-plane directions of the first substrate 10, a direction in which a first scanning line 1a extends is referred to as a first direction X, and a direction in which a data line 6a extends is referred to as a second direction Y. In addition, one side of a direction along the first direction X is referred to as a one side X1 of the first direction X. The other side of the direction along the first direction X is referred to as the other side X2 of the first direction X. One side of a direction along the second direction Y is referred to as a one side Y1 of the second direction Y. The other side of the direction along the second direction Y is referred to as the other side Y2 of the second direction Y.

First Embodiment

1. Entire Configuration of Electro-Optical Device 100

Figure 2:
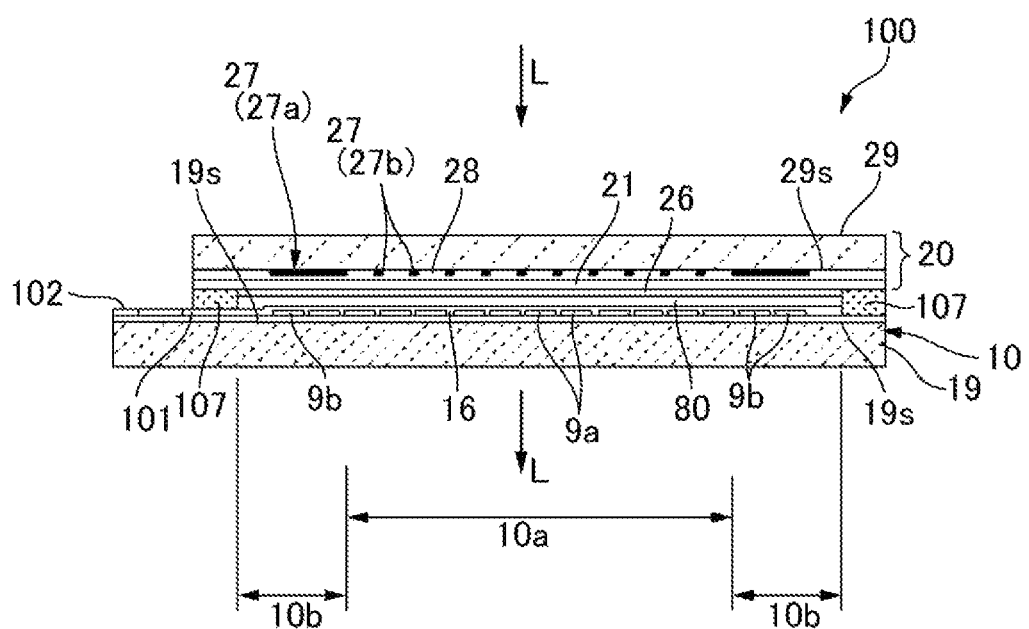
FIG. 2 is a cross-sectional view of the electro-optical device illustrated in FIG. 1.

FIG. 1 is a plan view of an electro-optical device 100 according to a first embodiment of the present disclosure. FIG. 2 is a cross-sectional view of the electro-optical device 100 illustrated in FIG. 1. As illustrated in FIGS. 1 and 2, in the electro-optical device 100, a first substrate 10 and a second substrate 20 are affixed to each other using a seal material 107 with a predetermined space being provided therebetween. The first substrate 10 and the second substrate 20 are opposed to each other. The seal material 107 is provided in a frame shape so as to be along the outer periphery of the second substrate 20. An electro-optical layer 80 such as a liquid crystal layer is disposed in a region surrounded by the seal material 107 between the first substrate 10 and the second substrate 20. The seal material 107 is an adhesive having a photocurable property or an adhesive having a photocurable property and thermosetting property. The seal material 107 contains glass fiber or a gap material such as a glass bead used to make a distance of a predetermined value between both substrates. In this embodiment, the first substrate 10 and the second substrate 20 each have a quadrilateral shape. A display region 10a, which is a quadrilateral region, is provided substantially at the center of the electro-optical device 100. In response to this shape, the seal material 107 is also provided so as to have a substantially quadrilateral shape, and a peripheral area 10b having a rectangular frame shape is provided between the inner peripheral edge of the seal material 107 and the outer peripheral edge of the display region 10a.

The first substrate 10 includes a light-transmitting substrate body 19 made, for example, of a quartz substrate, a glass substrate, or the like. A data line driving circuit 101 and a plurality of terminals 102 are provided at one surface 19s of the substrate body 19 on the electro-optical layer 80 side so as to be along one side of the substrate body 19 and outside of the display region 10a. In addition, a scanning line drive circuit 104 is provided along other sides adjacent to this one side. Although illustration is not given, a flexible wiring substrate is coupled to the terminals 102. Various types of potentials and various types of signals are inputted into the first substrate 10 through the flexible wiring substrate.

The display region 10a includes a plurality of transmissive pixel electrodes 9a comprised of an indium tin oxide (ITO) film or the like and formed into a matrix manner at the side of the one surface 19s of the substrate body 19. A first alignment film 16 is formed at the pixel electrode 9a on the electro-optical layer 80 side, and the pixel electrodes 9a are covered with the first alignment film 16. Thus, a portion extending from the substrate body 19 to the first alignment film 16 corresponds to the first substrate 10.

The second substrate 20 includes a light-transmitting substrate body 29 comprised, for example, of a quartz substrate or a glass substrate. At one surface 29s of the substrate body 29 that is located at the electro-optical layer 80 side, a light-transmitting common electrode 21 comprised of an ITO film or the like is formed, and a second alignment film 26 is formed at the common electrode 21 on the first substrate 10 side. Thus, a portion from the substrate body 29 to the second alignment film 26 corresponds to the second substrate 20. The common electrode 21 is formed at substantially the entire area of the second substrate 20, and is covered with the second alignment film 26. The second substrate 20 includes a light shielding film 27 having a light shielding property and formed between the substrate body 29 and the common electrode 21, the light shielding film 27 being made of resin, metal, or a metallic compound. A transmissive protection layer 28 is formed between the light shielding film 27 and the common electrode 21. For example, the light shielding film 27 is formed as a parting 27a having a frame shape and extending along the outer peripheral edge of the display region 10a. The light shielding film 27 is also formed as a light shielding film 27b that forms a black matrix at a region that overlaps, in plan view, with a region interposed between adjacent pixel electrodes 9a. A dummy pixel electrode 9b, which is formed at the same time as the pixel electrode 9a, is formed in a region that overlaps, in plan view, with the parting 27a in the peripheral area 10b of the first substrate 10. Note that a lens may be provided at a position that is opposed to the pixel electrode 9a in the second substrate 20. In this case, the light shielding film 27b is typically not formed.

The first alignment film 16 and the second alignment film 26 are inorganic alignment films comprised, for example, of a diagonally vapor-deposited film made out of $SiO_x$ (x<2), $SiO_2$, $TiO_2$, $MgO$, $Al_2O_3$, and are formed such that liquid crystal molecules having negative dielectric anisotropy and used in the electro-optical layer 80 are aligned in an inclined manner. Thus, the liquid crystal molecules form a predetermined angle with respect to the first substrate 10 and the second substrate 20. In this manner, the electro-optical device 100 is configured as a liquid crystal device in a vertical alignment (VA) mode.

At the first substrate 10, an inter-substrate conduction electrode 109 is formed at an outer side than the seal material 107. The inter-substrate conduction electrode 109 is used to allow the first substrate 10 and the second substrate 20 to be electrically continuous with each other. An inter-substrate conduction material 109a containing electrically conductive particles is provided at the inter-substrate conduction electrode 109. The common electrode 21 of the second substrate 20 is electrically coupled to the first substrate 10 through the inter-substrate conduction material 109a and the inter-substrate conduction electrode 109. This enables a common potential to be applied to the common electrode 21 from the side of the first substrate 10.

In the electro-optical device 100 according to this embodiment, the pixel electrode 9a and the common electrode 21 are made out of a transmissive conductive film such as an ITO film, and the electro-optical device 100 is configured as a transmission-type liquid crystal device. With such an electro-optical device 100, light entering the electro-optical layer 80 from a side of either one substrate of the first substrate 10 and the second substrate 20 is modulated while passing through the substrate at the other side and being outputted from the substrate, whereby an image is displayed. In this embodiment, as indicated by the arrow L, light entering from the second substrate 20 is modulated by the electro-optical layer 80 in each pixel while passing through the first substrate 10 and being outputted from the first substrate 10, whereby an image is displayed.

2. Schematic Configuration of Pixels

Figure 3:
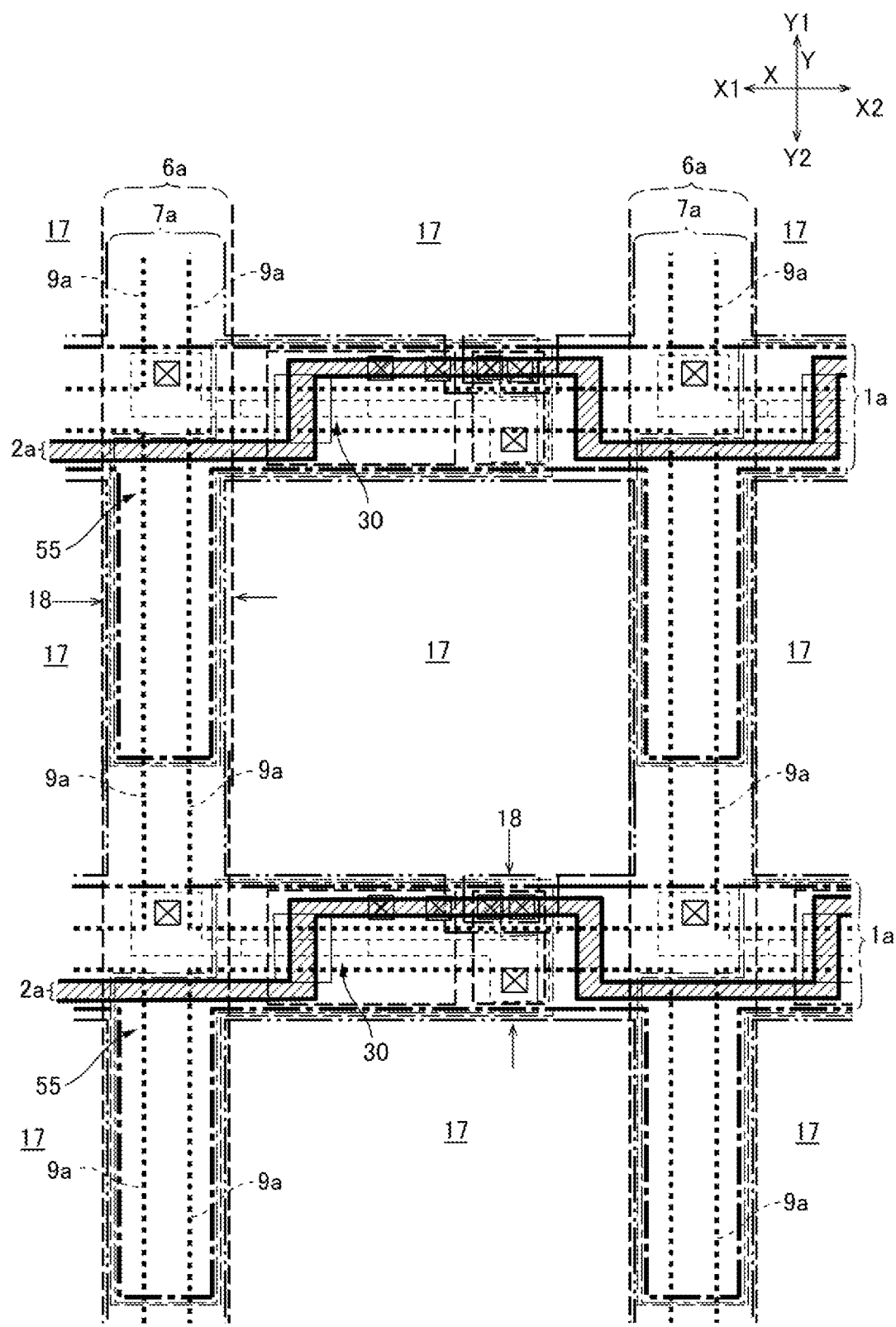
FIG. 3 is a plan view of a plurality of pixels adjacent to each other in the electro-optical device illustrated in FIG. 1.
Figure 4:
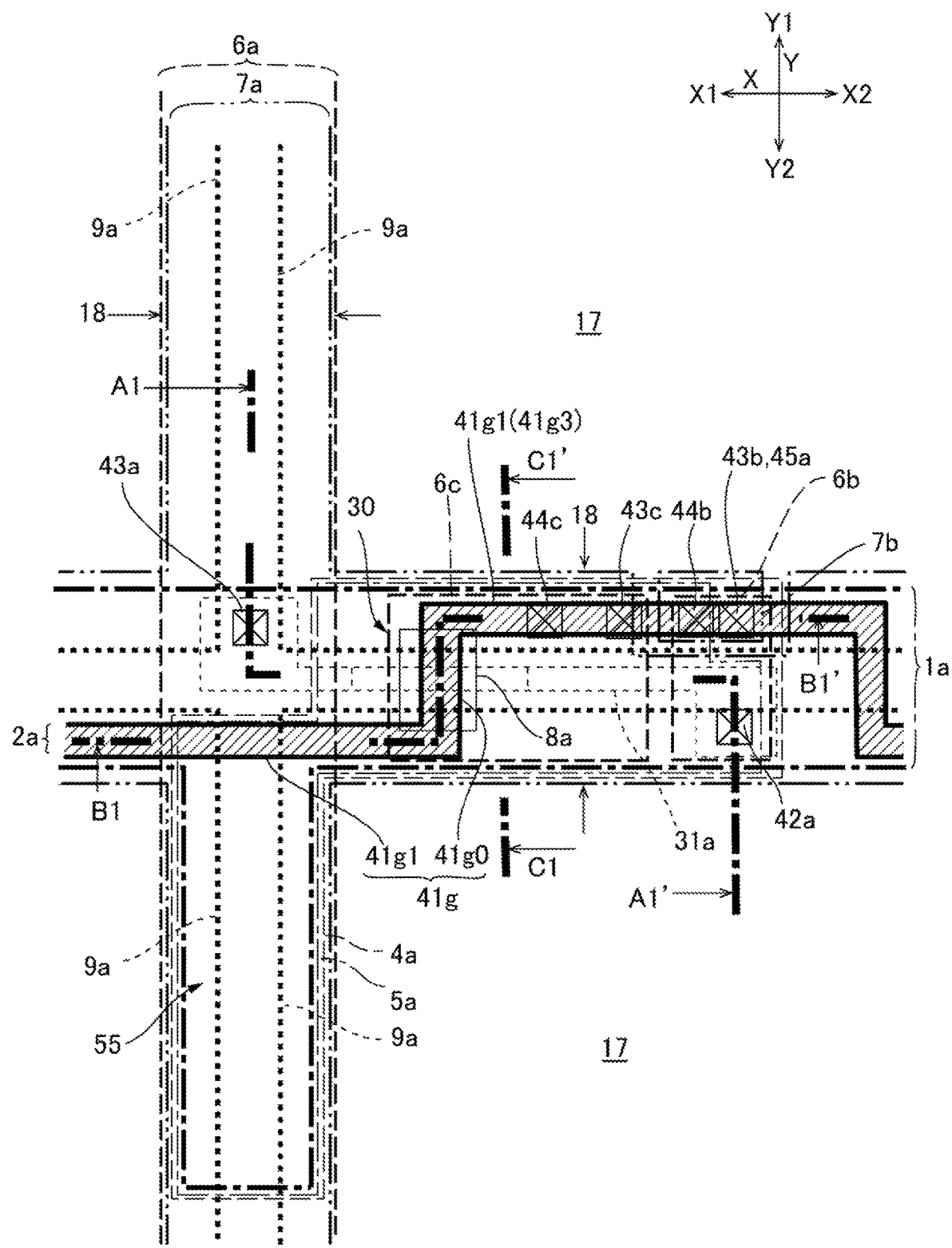
FIG. 4 is an enlarged plan view illustrating one of the pixels illustrated in FIG. 3.
Figure 5:
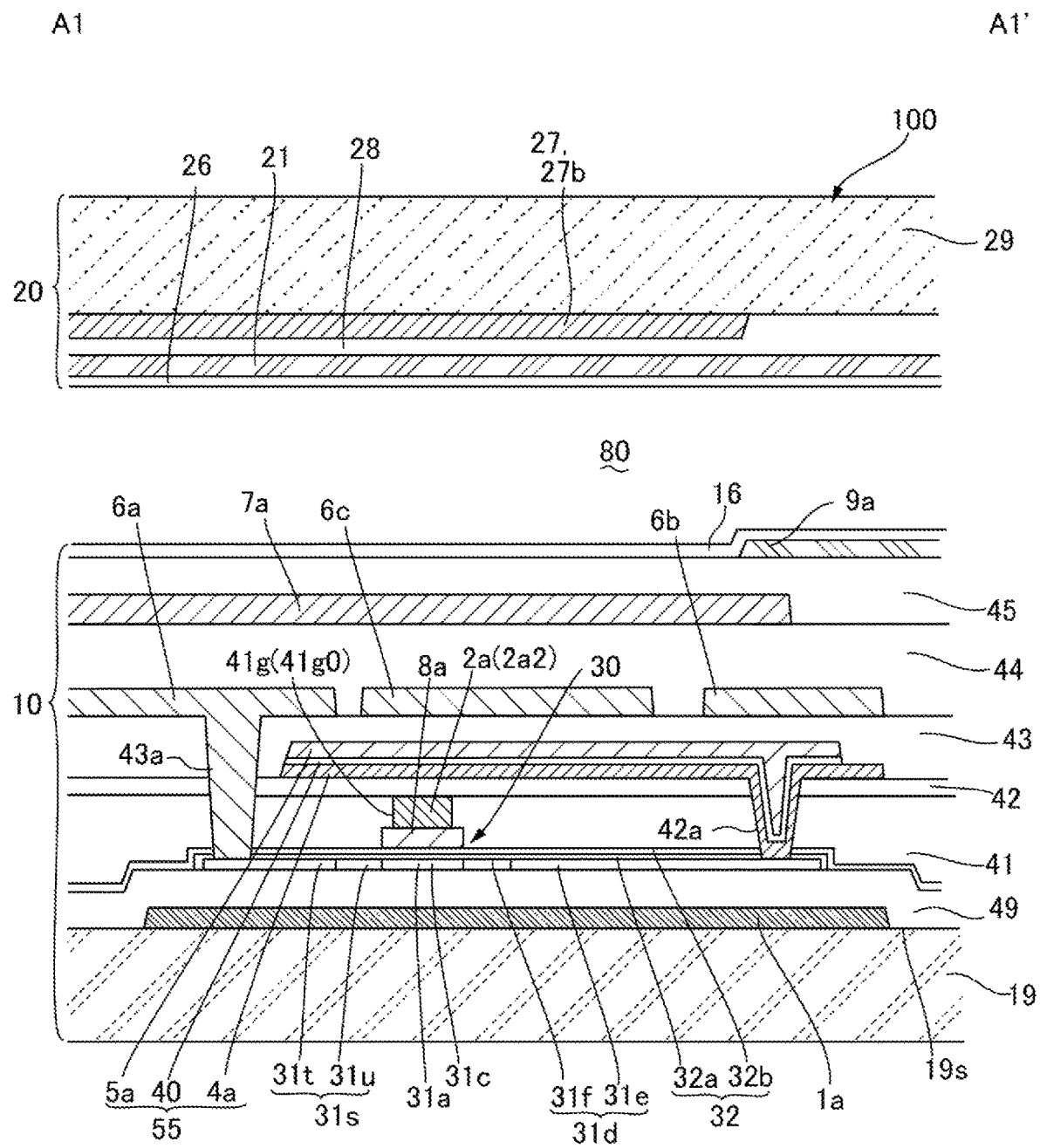
FIG. 5 is a cross-sectional view taken along A1-A1' of FIG. 4.
Figure 6:
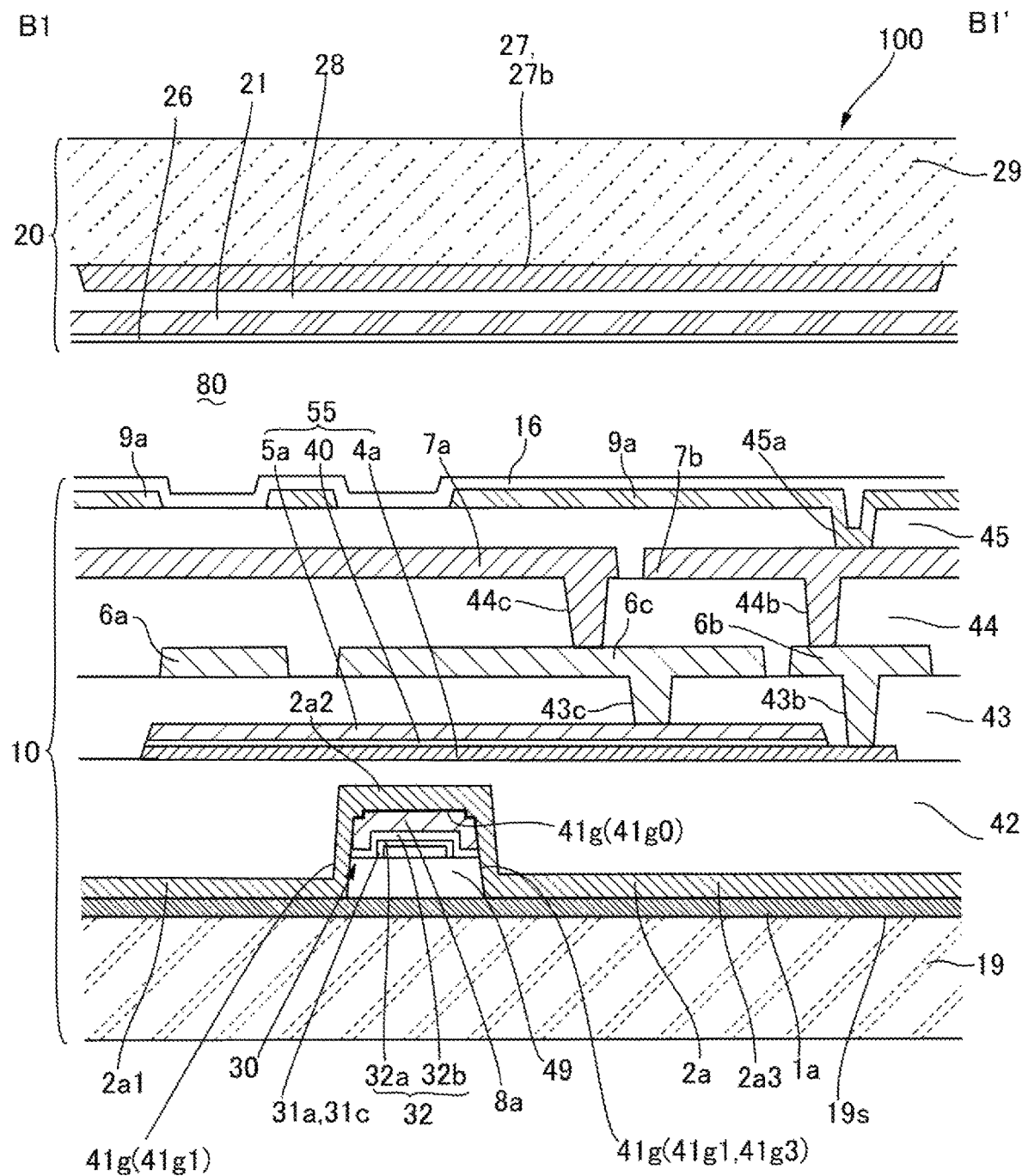
FIG. 6 is a cross-sectional view taken along B1-B1' of FIG. 4.
Figure 7:
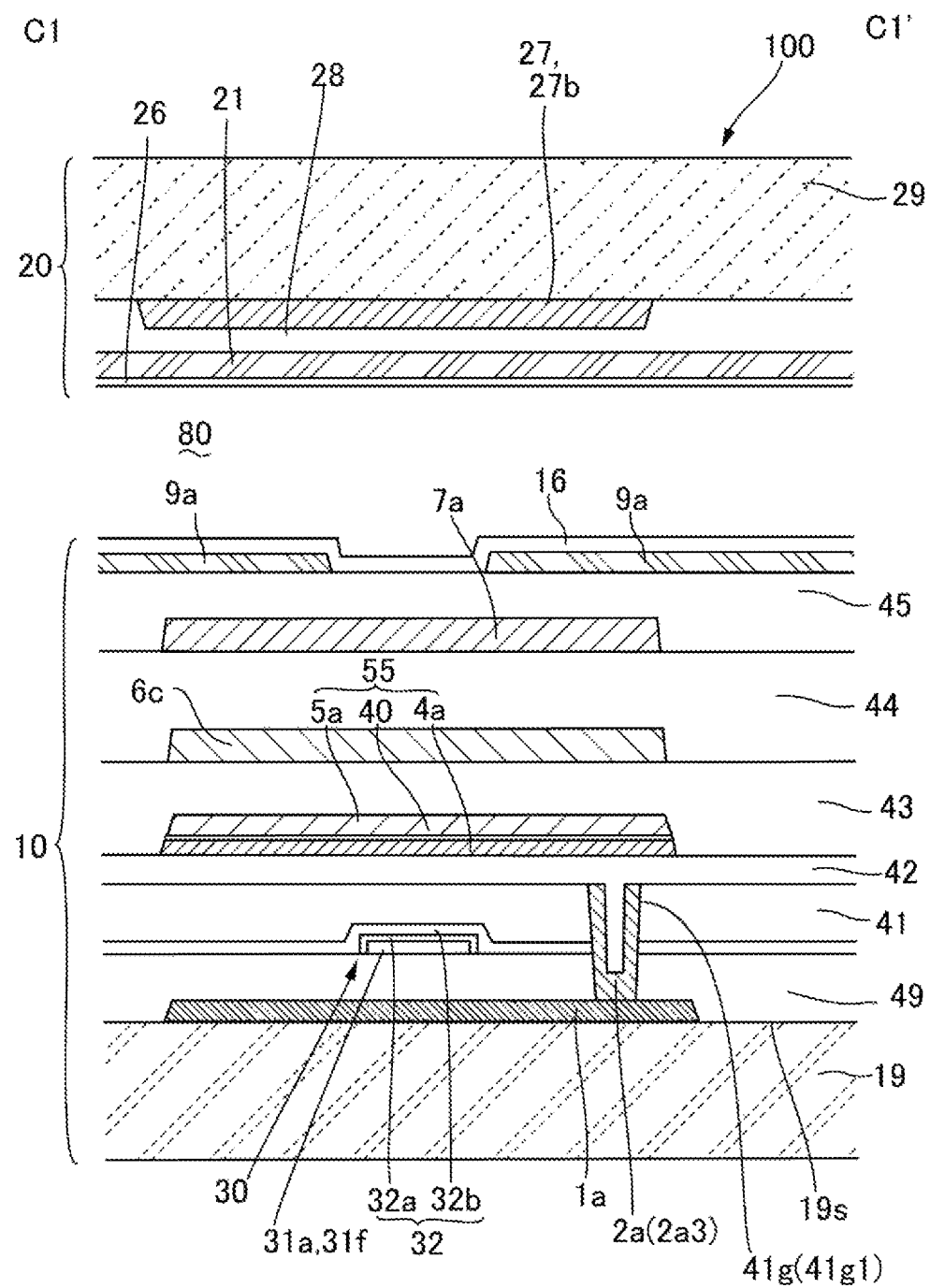
FIG. 7 is a cross-sectional view taken along C1-C1' of FIG. 4.

FIG. 3 is a plan view of a plurality of pixels adjacent to each other in the electro-optical device 100 illustrated in FIG. 1. FIG. 4 is an enlarged plan view illustrating one of the pixels illustrated in FIG. 3. In FIG. 4, the transistor 30 and its surroundings are illustrated in an enlarged manner. FIG. 5 is a cross-sectional view taken along A1-A1' of FIG. 4. FIG. 6 is a cross-sectional view taken along B1-B1' of FIG. 4. FIG. 7 is a cross-sectional view taken along C1-C1' of FIG. 4. FIGS. 5, 6, and 7 each schematically illustrate a state where the electro-optical device 100 is taken along the A1-A1' line, the B1-B1' line, and the C1-C1' line. In FIGS. 3 and 4, and FIGS. 8 to 10, which will be described later, individual layers are illustrated using the lines described below. Furthermore, in FIGS. 3 and 4, and FIGS. 8 to 10, which will be described later, end portions of layers that overlap with each other in plan view are illustrated in a manner such that the positions of these end portions are shifted in order to allow the shapes of the layers or the like to be easily recognized. In addition, a groove 41g is illustrated as a region to which diagonal hatching that slants up to the right is applied.

First scanning line 1a=thick long dashed short dashed line
Semiconductor film 31a=thin short dashed line
Gate electrode 8a=thin solid line
Second scanning line 2a=thick solid line
First capacitance electrode 4a=thin long dashed line
Second capacitance electrode 5a=thin long dashed short dashed line
Data line 6a and relay electrode 6b, 6c=thick long dashed line
Capacitance line 7a and relay electrode 7b=thick long dashed double-short dashed line
Pixel electrode 9a=thick short dashed line At a surface of the first substrate 10 that is opposed to the second substrate 20, a pixel electrode 9a is formed in each of the plurality of pixels, and the first scanning line 1a, the data line 6a, and the capacitance line 7a extend along an inter-pixel region interposed between adjacent pixel electrodes 9a, as illustrated in FIGS. 3 and 4. The first scanning line 1a extends along the first direction X in the inter-pixel region. The data line 6a extends in the second direction Y in the inter-pixel region. The capacitance line 7a extends along the first direction X and the second direction Y in the inter-pixel region. Furthermore, the transistor 30 is formed so as to correspond to an intersection of the data line 6a and the first scanning line 1a. The first scanning line 1a, the data line 6a, and the capacitance line 7a each have a light shielding property. Thus, a region where the first scanning line 1a, the data line 6a, the capacitance line 7a, and electrodes disposed at the same layer as these wiring lines are formed serves as a light shielding region 18 where light does not pass through. A region surrounded by the light shielding region 18 serves as an opening area 17.

In the first substrate 10, inter-layer insulating films 49, 41, 42, 43, 44, and 45 are stacked sequentially from the side of the substrate body 19 between the substrate body 19 and the pixel electrode 9a, as illustrated in FIGS. 5, 6, and 7. Each of the inter-layer insulating films 49, 41, 42, 43, 44, and 45 is a light-transmitting insulation film such as a silicon oxide film. In this embodiment, the surface of each of the inter-layer insulating films 41, 43, 44, and 45 at the pixel electrode 9a side is a continuous flat surface obtained through chemical and mechanical polishing or the like.

In this embodiment, of the inter-layer insulating films 49, 41, 42, 43, 44, and 45, the inter-layer insulating film 49 serves as a "first inter-layer insulating film" in the present disclosure. The inter-layer insulating film 41 serves as a "second inter-layer insulating film" in the present disclosure. The inter-layer insulating film 42 serves as a "third inter-layer insulating film" in the present disclosure. The gate insulating film 32 and a portion of the gate electrode 8a are covered with the inter-layer insulating film 41.

3. General Description of Each Layer

Figure 8:
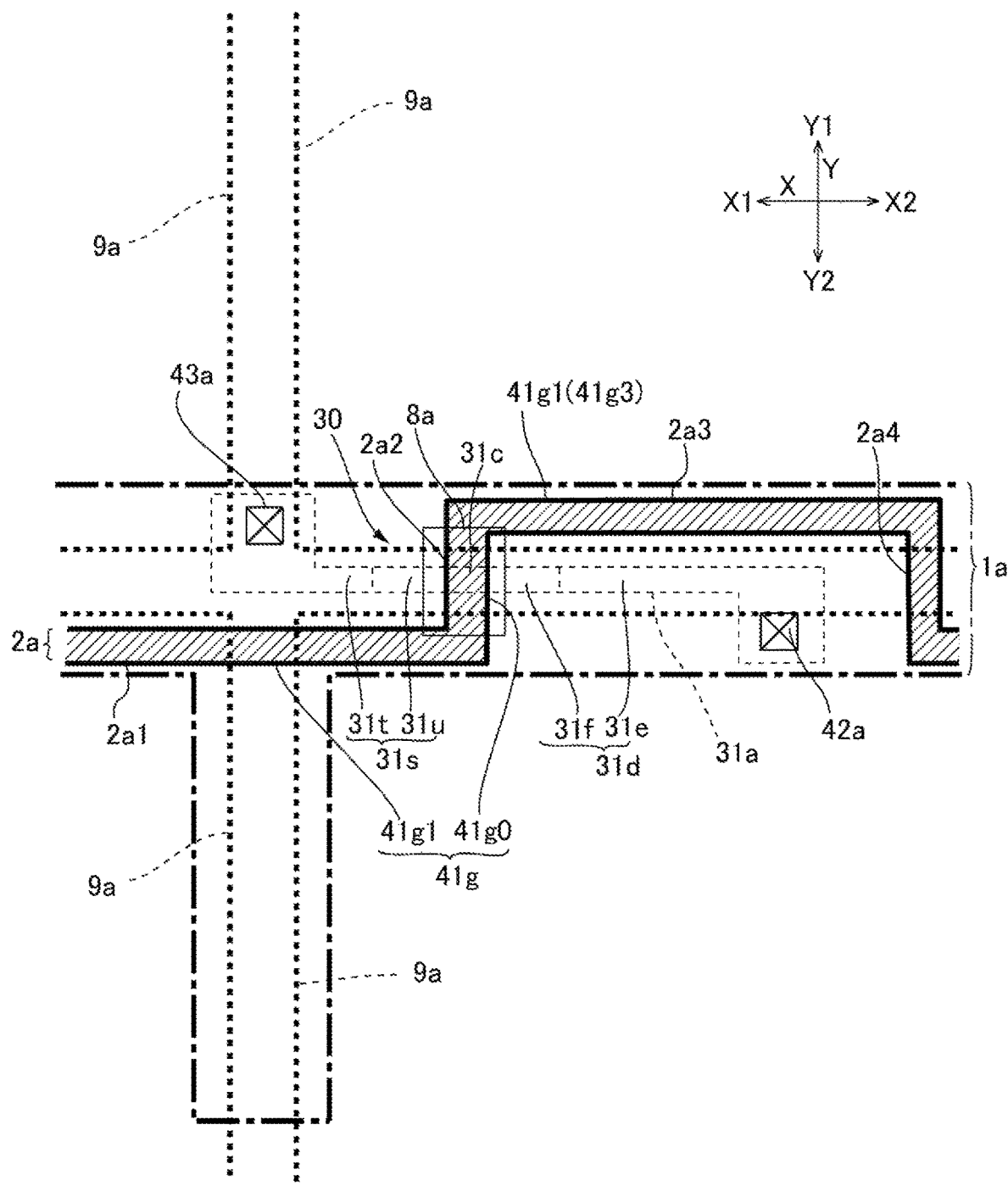
FIG. 8 is a plan view of a first scanning line, a semiconductor film, a gate electrode, a second scanning line, and the like illustrated in FIG. 4.
Figure 9:
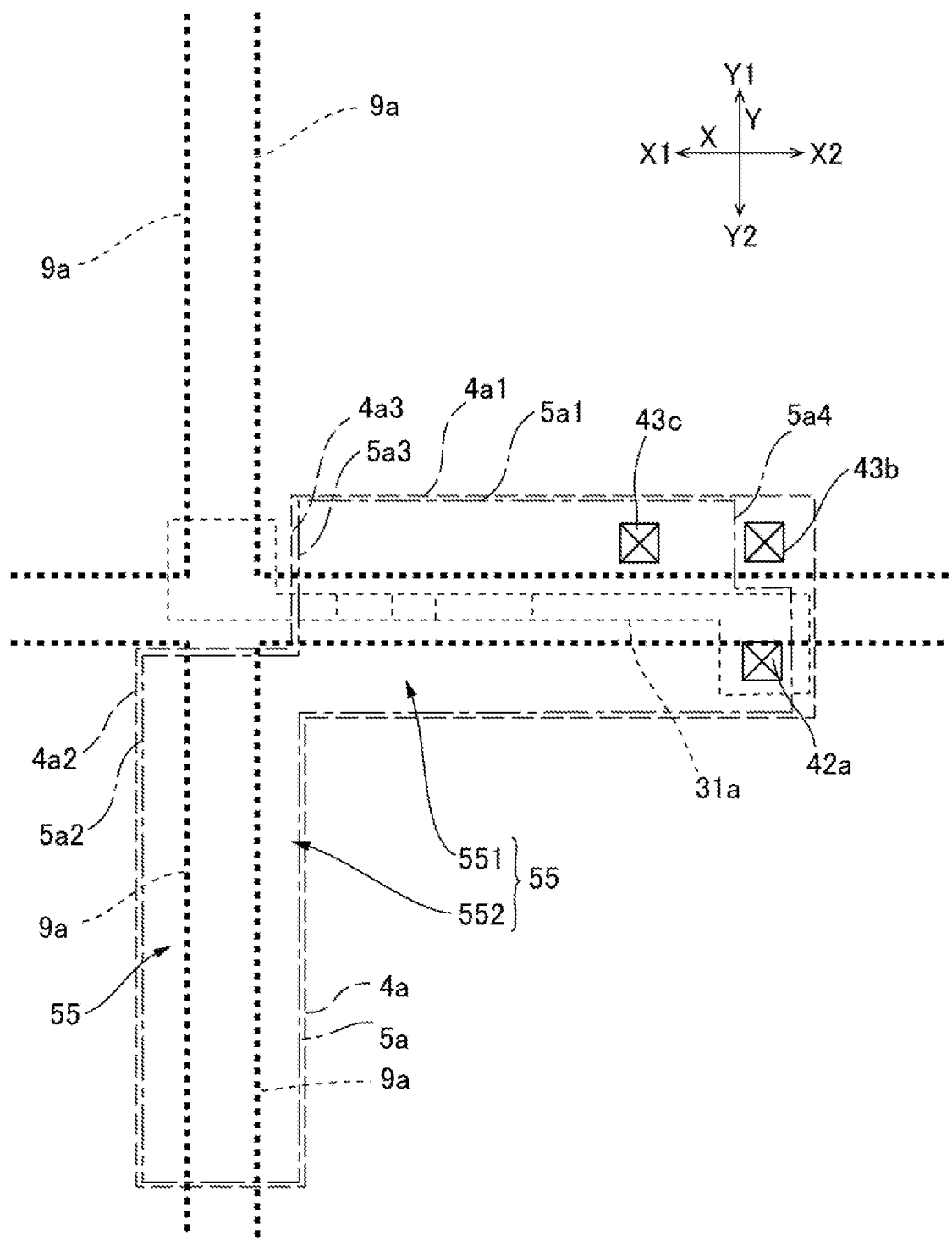
FIG. 9 is a plan view of a first capacitor electrode, a second capacitor electrode, and the like illustrated in FIG. 4.
Figure 10:
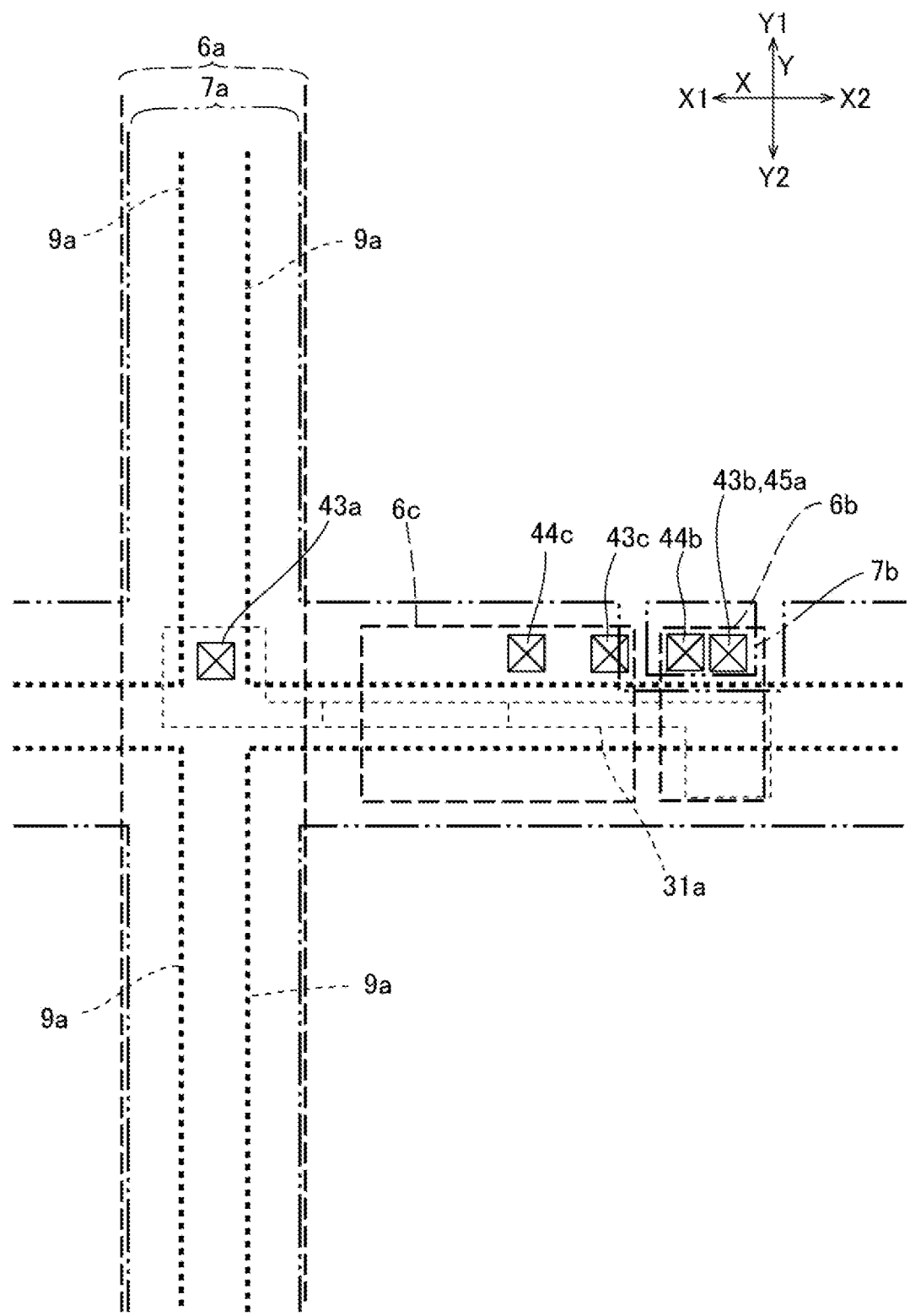
FIG. 10 is a plan view of a data line, a capacitance line, and the like illustrated in FIG. 4.

Detailed configuration of the first substrate 10 will be described with reference to FIGS. 5, 6, and 7 and also with reference to FIGS. 8 to 10 on an as-necessary basis. FIG. 8 is a plan view of the first scanning line 1a, the semiconductor film 31a, the gate electrode 8a, the second scanning line 2a, and the like illustrated in FIG. 4. FIG. 9 is a plan view of the first capacitance electrode 4a, the second capacitance electrode 5a, and the like illustrated in FIG. 4. FIG. 10 is a plan view of the data line 6a, the capacitance line 7a, and the like illustrated in FIG. 4. FIGS. 8 to 10 illustrate contact holes related to the electrical coupling of the electrodes and the like illustrated in these drawings, and also illustrate the semiconductor film 31a and the pixel electrode 9a to indicate the reference positions.

Between the substrate body 19 and the pixel electrode 9a, the first scanning line 1a having a light shielding property is formed in a layer between the substrate body 19 and the inter-layer insulating film 49, as illustrated in FIGS. 5, 6, and 7. The first scanning line 1a includes a light shielding film made out, for example, of transition metal such as titanium, chromium, tungsten, tantalum, molybdenum, or palladium, or a silicide compound of transition metal. In this embodiment, the first scanning line 1a is made out of tungsten silicide.

Between the substrate body 19 and the pixel electrode 9a, the transistor 30 for pixel switching is provided in a layer between the inter-layer insulating film 49 and the inter-layer insulating film 41. The transistor 30 includes: the semiconductor film 31a formed between the first scanning line 1a and the pixel electrode 9a and at an opposite surface of the inter-layer insulating film 49 from the substrate body 19; the gate insulating film 32 covering the semiconductor film 31a from the pixel electrode 9a side; and the gate electrode 8a that overlaps, in plan view, with a portion of the semiconductor film 31a from the side of the pixel electrode 9a with the gate insulating film 32 being interposed between the portion of the semiconductor film 31a and the gate electrode 8a. The semiconductor film 31a is comprised of a polysilicon film. The gate insulating film 32 has a two-layer structure including a first gate insulating film 32a including a silicon oxide film obtained through thermal oxidation of the semiconductor film 31a, and a second gate insulating film 32b including a silicon oxide film formed through a low-pressure CVD method or the like. The gate electrode 8a includes a layer comprised, for example, of an electrically conductive polysilicon film, or a conductive film made out, for example, of aluminum, titanium, chromium, tungsten, tantalum, molybdenum, and palladium. In this embodiment, the gate electrode 8a is comprised of an electrically conductive polysilicon film.

Between the gate electrode 8a and the pixel electrode 9a, the second scanning line 2a having a light shielding property and extending in the first direction X is formed in a layer between the gate electrode 8a and the inter-layer insulating film 42. The second scanning line 2a is electrically coupled to the gate electrode 8a and the first scanning line 1a, as described later. The second scanning line 2a includes a light shielding film comprised, for example, of a metal having a light shielding property made of aluminum, titanium, chromium, tungsten, tantalum, molybdenum, palladium, or the like, or a metallic compound having a light shielding property. In this embodiment, the second scanning line 2a is made of tungsten.

As illustrated in FIG. 8, the first scanning line 1a straightly extends along the first direction X at a constant width size. The semiconductor film 31a extends in the first direction X so as to overlap with the first scanning line 1a in plan view. The gate electrode 8a overlaps, in plan view, with a portion of the semiconductor film 31a that is located at the partway in the longitudinal direction. The semiconductor film 31a includes a data-line-side source drain region 31s located at one side X1 in the first direction X with respect to the channel region 31c overlapping with the gate electrode 8a, the one side X1 being where the data line 6a is disposed. The data-line-side source drain region 31s includes a first region 31t spaced apart from the channel region 31c toward the one side X1 in the first direction X, and also includes a first low-concentration region 31u interposed between the first region 31t and the channel region 31c. The first low-concentration region 31u has a concentration of impurity lower than that of the first region 31t. The semiconductor film 31a includes a pixel-electrode-side source drain region 31d located at the other side X2 in the first direction X with respect to the channel region 31c, the other side X2 being an opposite side from the data line 6a. The pixel-electrode-side source drain region 31d includes a second region 31e spaced apart from the channel region 31c, and a second low-concentration region 31f interposed between the second region 31e and the channel region 31c. The second low-concentration region 31f has a concentration of impurity lower than that of the second region 31e. In this manner, the transistor 30 is configured as a field-effect-type transistor having a lightly doped drain (LDD) structure.

The second scanning line 2a extends in the first direction X in a region that overlaps with the first scanning line 1a in plan view, and a portion thereof overlaps with the gate electrode 8a. The second scanning line 2a is electrically coupled to the gate electrode 8a through a first contact portion 41g0 that overlaps with the gate electrode 8a in plan view, and is electrically coupled to the first scanning line 1a through a second contact portion 41g1 that overlaps with the first scanning line 1a in plan view. Thus, in the electro-optical device 100 according to this embodiment, the scanning lines with multilayered wiring lines are formed with the first scanning line 1a and the second scanning line 2a.

In this embodiment, the first contact portion 41g0 and the second contact portion 41g1 are each comprised of a portion of the groove 41g extending in the first direction X so as to overlap with the first scanning line 1a in plan view. The second scanning line 2a is comprised of a conductive film having a light shielding property. The inner wall of the groove 41g is covered with this conductive film. The detailed configuration of the second scanning line 2a will be described after all the schematic configuration of the pixels are described.

In FIGS. 5, 6, and 7, between the second scanning line 2a and the pixel electrode 9a, a capacitance element 55 including the first capacitance electrode 4a, a dielectric layer 40, and the second capacitance electrode 5a is provided in a layer between the inter-layer insulating film 42 and an inter-layer insulating film 43. The capacitance element 55 overlaps with the semiconductor film 31a in plan view from the side of the pixel electrode 9a. The first capacitance electrode 4a and the second capacitance electrode 5a include a conductive film such as an electrically conductive polysilicon film, a metal film, or a metallic compound film. In this embodiment, the first capacitance electrode 4a and the second capacitance electrode 5a are each comprised of an electrically conductive polysilicon film.

As illustrated in FIG. 9, the first capacitance electrode 4a includes a main body portion 4a1 extending in the first direction X so as to overlap with the first scanning line 1a and the semiconductor film 31a in plan view, and also includes a protrusion 4a2 protruding so as to overlap with the data line 6a in plan view from the main body portion 4a1. The end portion of the main body portion 4a1 is electrically coupled to the second region 31e of the semiconductor film 31a through a third contact portion 42a comprised of a contact hole extending through the inter-layer insulating films 41 and 42 and the gate insulating film 32. The first capacitance electrode 4a includes a cutout 4a3 formed so as not to overlap, in plan view, with the end portion of the semiconductor film 31a that overlaps with the data line 6a.

The second capacitance electrode 5a includes a main body portion 5a1 overlapping with a main body portion 5a1 of the first capacitance electrode 4a in plan view, and also includes a protrusion 5a2 overlapping with the protrusion 4a2 of the first capacitance electrode 4a in plan view. Thus, the capacitance element 55 includes a first element portion 551 extending in the first direction X so as to overlap with the semiconductor film 31a and a second element portion 552 extending in the second direction Y so as to overlap with the data line 6a. In addition, the second capacitance electrode 5a includes a cutout 5a3 formed so as not to overlap, in plan view, with the end portion of the semiconductor film 31a that overlaps with the data line 6a, as with the first capacitance electrode 4a. Furthermore, the end portion, at the other side X2 in the first direction X, of the main body portion 5a1 of the second capacitance electrode 5a includes a cutout 5a4 formed so as not to overlap with the end portion of the main body portion 4a1 of the first capacitance electrode 4a.

In FIGS. 5, 6, and 7, between the second scanning line 2a and the pixel electrode 9a, the data line 6a and the relay electrodes 6b and 6c are provided in a layer between the inter-layer insulating film 43 and the inter-layer insulating film 44. The data line 6a and the relay electrodes 6b and 6c include the same conductive film having a light shielding property. For example, the data line 6a and the relay electrodes 6b and 6c include a light shielding film made out of metal having a light shielding property such as aluminum, titanium, chromium, tungsten, tantalum, molybdenum, or palladium, or a metallic compound having a light shielding property. In this embodiment, the second scanning line 2a includes an aluminum film. The data line 6a is electrically coupled to the first region 31t through a fourth contact portion 43a comprised of a contact hole extending through the inter-layer insulating film 43 and the gate insulating film 32. The fourth contact portion 43a is formed at a portion corresponding to the cutout 4a3 of the first capacitance electrode 4a described with reference to FIG. 9 and the cutout 5a3 of the second capacitance electrode 5a. This enables the fourth contact portion 43a and the capacitance element 55 to be spaced apart from each other. The relay electrode 6b is electrically coupled to the first capacitance electrode 4a through a contact hole 43b extending through the inter-layer insulating film 43. The contact hole 43b is formed at a portion corresponding to the cutout 5a4 of the second capacitance electrode 5a described with reference to FIG. 9. A relay electrode 6c is electrically coupled to the second capacitance electrode 5a through the contact hole 43c extending through the inter-layer insulating film 43. The relay electrode 6c constitutes a light shielding member overlapping with the semiconductor film 31a in plan view from the side of the pixel electrode 9a.

Between the second scanning line 2a and the pixel electrode 9a, the capacitance line 7a and a relay electrode 7b are provided in a layer between the inter-layer insulating film 44 and the inter-layer insulating film 45. The capacitance line 7a and the relay electrode 7b include a conductive film having the same light shielding property. For example, the capacitance line 7a and the relay electrode 7b include a light shielding film made out of metal having a light shielding property such as aluminum, titanium, chromium, tungsten, tantalum, molybdenum, or palladium, or a metallic compound having a light shielding property. In this embodiment, the capacitance line 7a and the relay electrode 7b include an aluminum film. The capacitance line 7a is electrically coupled to the relay electrode 6c through a contact hole 44c extending through the inter-layer insulating film 44. This allows a common potential to be applied to the second capacitance electrode 5a from the capacitance line 7a. The relay electrode 7b is electrically coupled to the relay electrode 6b through a contact hole 44b extending through the inter-layer insulating film 44. In addition, the capacitance line 7a constitutes a light shielding member overlapping, in plan view, with the semiconductor film 31a from the side of the pixel electrode 9a.

As illustrated in FIG. 10, a cutout 7b3 is formed at a portion of the capacitance line 7a that extends in the first direction X, and a relay electrode 7b is formed at the inner side of the cutout 7b3. The capacitance line 7a overlaps, in plan view, with the semiconductor film 31a from the side of the pixel electrode 9a.

In FIGS. 5, 6, and 7, the inter-layer insulating film 45 includes a contact hole 45a. The pixel electrode 9a is electrically coupled to the relay electrode 7b through the contact hole 45a. This enables the pixel electrode 9a to be electrically coupled to the pixel-electrode-side source drain region 31d through the relay electrodes 7b and 6b and the first capacitance electrode 4a.

4. Detailed Description of Second Scanning Line 2a and the Like

As illustrated in FIGS. 5, 6, 7, and 8, in the electro-optical device 100 according to this embodiment, a third contact portion 42a that electrically couples the semiconductor film 31a and either one of the data line 6a and the pixel electrode 9a is provided at a position that overlaps with the first scanning line 1a in plan view. In this embodiment, the entire semiconductor film 31a overlaps with the first scanning line 1a in plan view. Thus, in addition to the third contact portion 42a, a fourth contact portion 43a that electrically couples the semiconductor film 31a and the other one of the data line 6a and the pixel electrode 9a is provided at a position that overlaps with the first scanning line 1a in plan view. For example, at the semiconductor film 31a, the end portion of the second region 31e at the other side X2 in the first direction X bends toward the other side Y2 in the second direction Y. At a position that overlaps with this end portion in plan view, there is provided the third contact portion 42a comprised of a contact hole for electrically coupling the second region 31e and the pixel electrode 9a. In addition, at the semiconductor film 31a, the end portion of the first region 31t at the one side X1 in the first direction X bends toward the one side Y1 in the second direction Y. At a position that overlaps with this end portion in plan view, there is the fourth contact portion 43a comprised of a contact hole for electrically coupling the first region 31t and the data line 6a.

Thus, in this embodiment, in a layer between the inter-layer insulating film 41 and the inter-layer insulating film 42, the second scanning line 2a extends in the first direction X in a region that overlaps with the first scanning line 1a in plan view. In association with this, the second scanning line 2a is configured to pass through a position spaced apart from the third contact portion 42a and the fourth contact portion 43a in the second direction Y and extend in the first direction X.

Furthermore, the third contact portion 42a is provided at a position that is shifted toward the other side Y2 in the second direction Y from the center of the first scanning line 1a in the width direction. In addition, the fourth contact portion 43a is provided at a position that is shifted toward the one side Y1 in the second direction Y from the center of the first scanning line 1a in the width direction. Thus, in a region that overlaps with the first scanning line 1a in plan view, the second scanning line 2a includes a first portion 2a1 extending in the first direction X at a side of the other side Y2 in the second direction Y with respect to the data-line-side source drain region 31s, and also includes a second portion 2a2 that bends toward the one side Y1 in the second direction Y from the end portion of the first portion 2a1 at the other side X2 in the first direction X and overlaps with the semiconductor film 31a with the gate electrode 8a being interposed between the semiconductor film 31a and the second portion 2a2. The second portion 2a2 intersects the semiconductor film 31a. In addition, the second scanning line 2a includes a third portion 2a3 extending in the first direction X at a side of the one side Y1 in the second direction Y with respect to the pixel-electrode-side source drain region 31d and from the end portion of the second portion 2a2 at the one side Y1 in the second direction Y, and also includes a fourth portion 2a4 that bends toward the other side Y2 in the second direction Y from the end portion of the third portion 2a3 toward the other side X2 in the first direction X, the bending being made at a region that does not overlap with the semiconductor film 31a.

In this embodiment, a groove 41g that entirely continues in the first direction X is provided in the inter-layer insulating film 41, and the second scanning line 2a is provided inside of the inter-layer insulating film 41. Thus, the first contact portion 41g0 is a portion of the groove 41g that penetrates through the inter-layer insulating film 41 serving as the second inter-layer insulating film and where the gate electrode 8*a* is exposed at the bottom of the groove 41*g*. Furthermore, at the first contact portion 41*g*0, the second portion 2*a*2 of the second scanning line 2*a* is electrically coupled to the gate electrode 8*a*. In addition, the second contact portion 41*g*1 is a portion of the groove 41*g* that penetrates through the inter-layer insulating film 41 serving as the second inter-layer insulating film, the gate insulating film 32, and the inter-layer insulating film 49 serving as the first inter-layer insulating film and also where the first scanning line 1*a* is exposed at the bottom of the groove 41*g*. In addition, the first portion 2*a*1, the third portion 2*a*3, and the fourth portion 2*a*4 of the second scanning line 2*a* are electrically coupled to the gate electrode 8*a* at the second contact portion 41*g*1. This enables the first contact portion 41*g*0 and the second contact portion 41*g*1 to be coupled to each other in plan view. Furthermore, the second scanning line 2*a* extends so as to intersect the semiconductor film 31*a* through the gate electrode 8*a* at the first contact portion 41*g*0. In addition, the third portion 2*a*3 is formed so as to be along an inner wall of a portion 41*g*3 of the second contact portion 41*g*1. The portion 41*g*3 extends at a side of the second low-concentration region 31*f* of the semiconductor film 31*a*, this side being at the one side Y1 in the second direction Y. The third portion 2*a*3 constitutes a light shielding wall for the second low-concentration region 31*f*.

5. Method of Manufacturing Electro-Optical Device 100

Of the method of manufacturing the electro-optical device 100 according to this embodiment, a step of manufacturing the second scanning line 2*a* includes forming the first scanning line 1*a*, the inter-layer insulating film 49, the transistor 30, and the inter-layer insulating film 41, and then, performing etching to form the groove 41*g*. Here, the inter-layer insulating films 41 and 49 and the gate insulating film 32 are each comprised of a silicon oxide film and the gate electrode 8*a* is comprised of an electrically conductive polysilicon film. Thus, the inter-layer insulating films 41 and 49 and the gate insulating film 32 have a high etching selectivity ratio relative to the gate electrode 8*a*. This makes it possible to use the gate electrode 8*a* as an etching stopper when etching is applied to the inter-layer insulating film 41 to form the groove 41*g*. In addition, the first scanning line 1*a* is made out of tungsten silicide. Thus, the inter-layer insulating films 41 and 49 and the gate insulating film 32 have a high etching selectivity ratio relative to the first scanning line 1*a*. This makes it possible to use the first scanning line 1*a* as an etching stopper when etching is applied to the inter-layer insulating film 41 to form the groove 41*g*.

Furthermore, the second scanning line 2*a* is formed such that a conductive film having a light shielding property is formed so as to fill the groove 41*g*, and then, the surface of the conductive film having the light shielding property together with the surface of the inter-layer insulating film 41 is polished, for example, through chemical and mechanical polishing. This makes it possible to form the second scanning line 2*a* without application of etching employing a photolithography technique.

Note that, in FIGS. 6 and 7, the second contact portion 41*g*1 is not completely filled with the second scanning line 2*a*. However, the second contact portion 41*g*1 may be completely filled with the second scanning line 2*a*.

6. Main Effects of this Embodiment

As described above, the electro-optical device 100 according to this embodiment includes the first scanning line 1*a* extending in the first direction X in a layer between the substrate body 19 and the pixel electrode 9*a* and also includes the second scanning line 2*a* extending in the first direction X in a layer between the gate electrode 8*a* and the pixel electrode 9*a*. The second scanning line 2*a* is electrically coupled to the gate electrode 8*a* at the first contact portion 41*g*0, and is also electrically coupled to the first scanning line 1*a* at the second contact portion 41*g*1. Thus, with the multiple layer structure, the electrical resistance of the scanning lines reduces, which makes it possible to reduce the time constant at the time of supplying a scanning signal to each pixel. This makes distortion or the like of the scanning line less likely to occur at the time of achieving high resolution of the electro-optical device 100.

In addition, the semiconductor film 31*a* overlaps with the first scanning line 1*a* in plan view. Thus, even when light outputted from the first substrate 10 side is reflected to enter the first substrate 10 again, such returned light is blocked by the first scanning line 1*a*. Thus, this light is less likely to enter the semiconductor film 31*a*. This makes optical leakage current less likely to occur in the transistor 30.

Furthermore, when the second scanning line 2*a* completely overlaps with the semiconductor film 31*a*, it is not possible to provide the third contact portion 42*a* that electrically couples the pixel electrode 9*a* and the semiconductor film 31*a*, and the fourth contact portion 43*a* that electrically couple the data line 6*a* and the semiconductor film 31*a*. However, in this embodiment, the second scanning line 2*a* passes through a position spaced apart in the second direction Y from the third contact portion 42*a* and the fourth contact portion 43*a*, and extends in the first direction X. Thus, even when the pixel aperture ratio is increased by overlapping the second scanning line 2*a* and the semiconductor film 31*a* with the first scanning line 1*a* in plan view, it is possible to appropriately electrically couple the pixel electrode 9*a* and the semiconductor film 31*a* and also appropriately electrically couple the data line 6*a* and the semiconductor film 31*a*.

In addition, the semiconductor film 31*a* is covered from a side of the pixel electrode 9*a* with a light shielding member including the relay electrode 6*c* and the capacitance line 7*a*. Thus, light passing through the electro-optical layer 80 and then entering the first substrate 10 is less likely to enter the semiconductor film 31*a*.

Furthermore, the second scanning line 2*a* having a light shielding property includes a portion of the second contact portion 41*g*1 that extends in the first direction X along the semiconductor film 31*a* and at a side of the semiconductor film 31*a*. In particular, the third portion 2*a*3 of the second scanning line 2*a* constitutes a light shielding wall formed so as to be along an inner wall of the portion 41*g*3 of the second contact portion 41*g*1 that extends at a side of the second low-concentration region 31*f* of the semiconductor film 31*a*, this side being at the one side Y1 in the second direction Y. Thus, by using the second scanning line 2*a* within the second contact portion 41*g*1, it is possible to prevent light passing through the electro-optical layer 80 and then entering the first substrate 10 or returned light, from entering the second low-concentration region 31*f*. Furthermore, in addition to the inter-layer insulating film 49 serving as the first inter-layer insulating film, the second contact portion 41*g*1 extends through the inter-layer insulating film 41 serving as the second inter-layer insulating film provided between the gate electrode 8*a* and the pixel electrode 9*a*. Thus, a wide area of the semiconductor film 31*a* in the thickness direction of the semiconductor film 31*a* is covered with the second scanning line 2*a* from the side. This makes it possible to appropriately suppress the light entering the second low-concentration region 31f, which makes the optical leakage current less likely to occur in the transistor 30.

Second Embodiment

Figure 11:
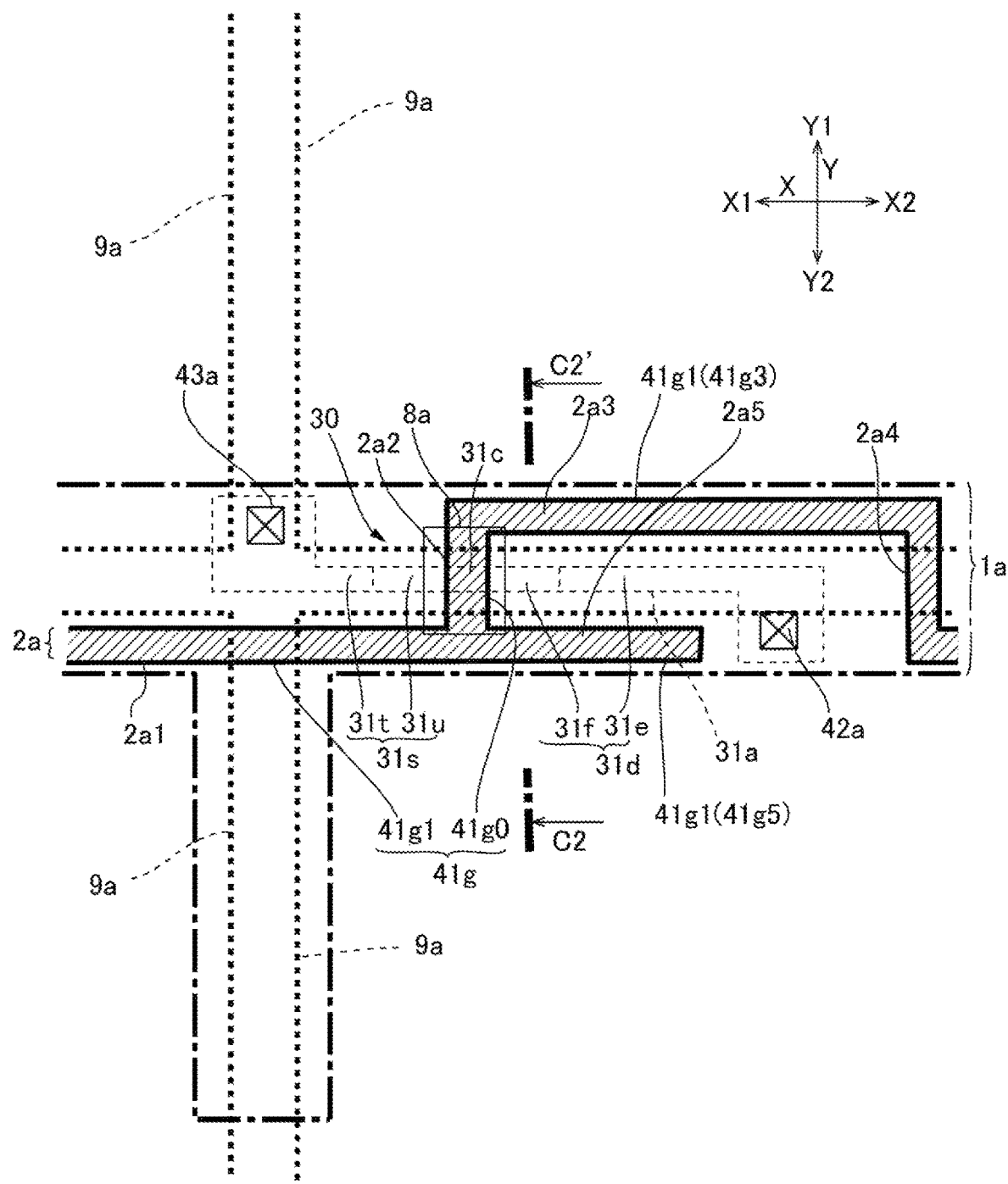
FIG. 11 is a plan view of an electro-optical device according to a second embodiment of the present disclosure.
Figure 12:
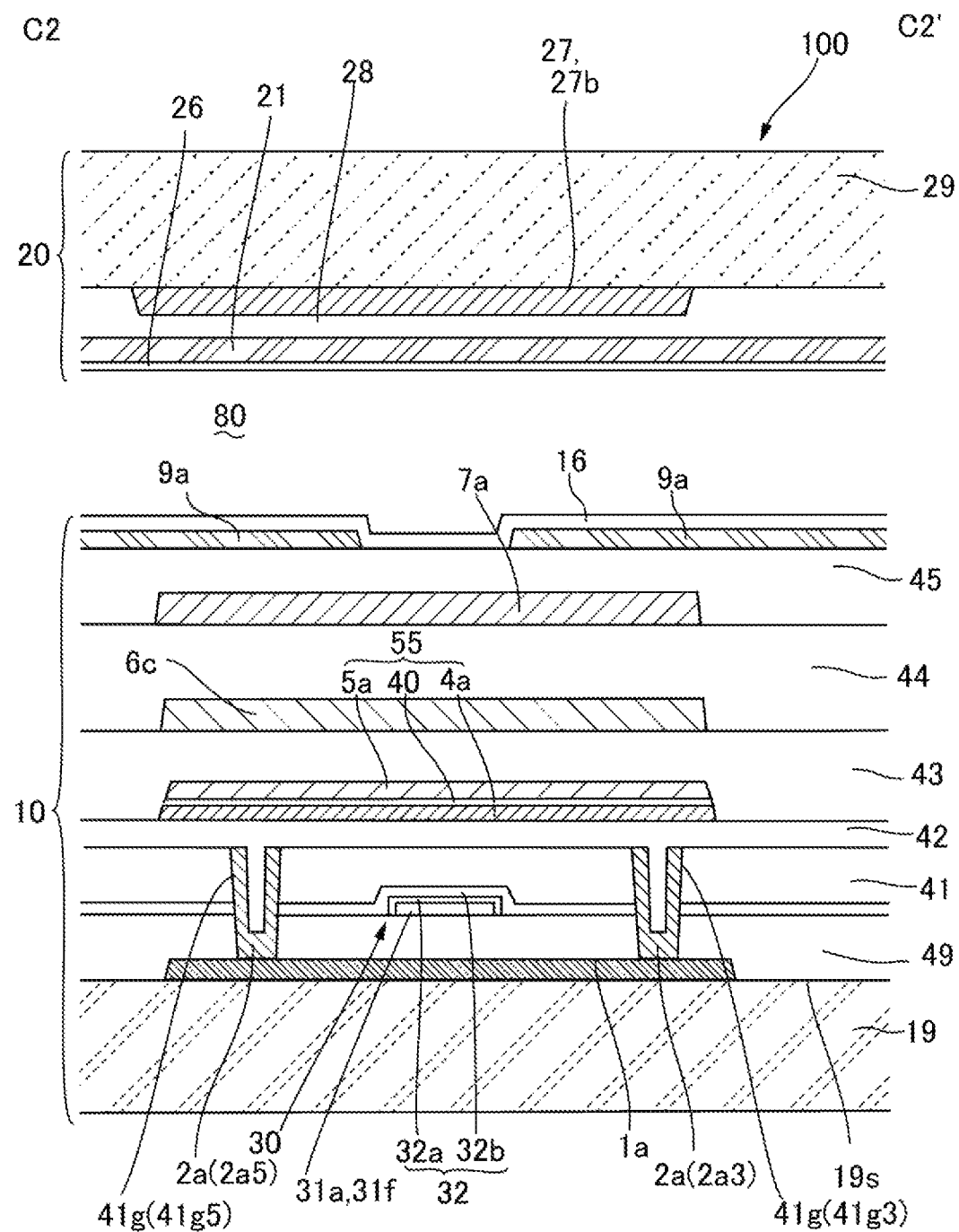
FIG. 12 is a cross-sectional view taken along C2-C2' of FIG. 11.

FIG. 11 is a plan view of an electro-optical device 100 according to a second embodiment of the present disclosure, and illustrates a planar configuration of the first scanning line 1a, the semiconductor film 31a, the gate electrode 8a, the second scanning line 2a, and the like. FIG. 12 is a cross-sectional view taken along C2-C2' in FIG. 11, and schematically illustrates a state in which the electro-optical device 100 is taken along the C2-C2' line. Note that basic configurations of this embodiment and the embodiments described later are similar to those in the first embodiment. Thus, the same reference characters are attached to corresponding portions, and explanation thereof will not be repeated.

In the first embodiment, the second scanning line 2a includes the third portion 2a3 formed so as to be along the inner wall of the portion 41g3 of the second contact portion 41g1 that extends at a side of the second low-concentration region 31f of the semiconductor film 31a, this side being at the one side Y1 in the second direction Y. In contrast, in this embodiment, in addition to the third portion 2a3, the second scanning line 2a includes a fifth portion 2a5 formed so as to be along an inner wall of a portion 41g5 of the second contact portion 41g1 that extends at a side of the second low-concentration region 31f of the semiconductor film 31a, this side being at the other side Y2 in the second direction Y, as illustrated in FIGS. 11 and 12. The rest of the configurations is similar to that in the first embodiment.

In the electro-optical device 100 configured as described above, the third portion 2a3 and the fifth portion 2a5 are provided at respective sides of the second low-concentration region 31f. This makes it possible to further suppress light entering the second low-concentration region 31f, as compared with the electro-optical device 100 according to the first embodiment. Thus, the optical leakage current is less likely to occur in the transistor 30.

Third Embodiment

Figure 13:
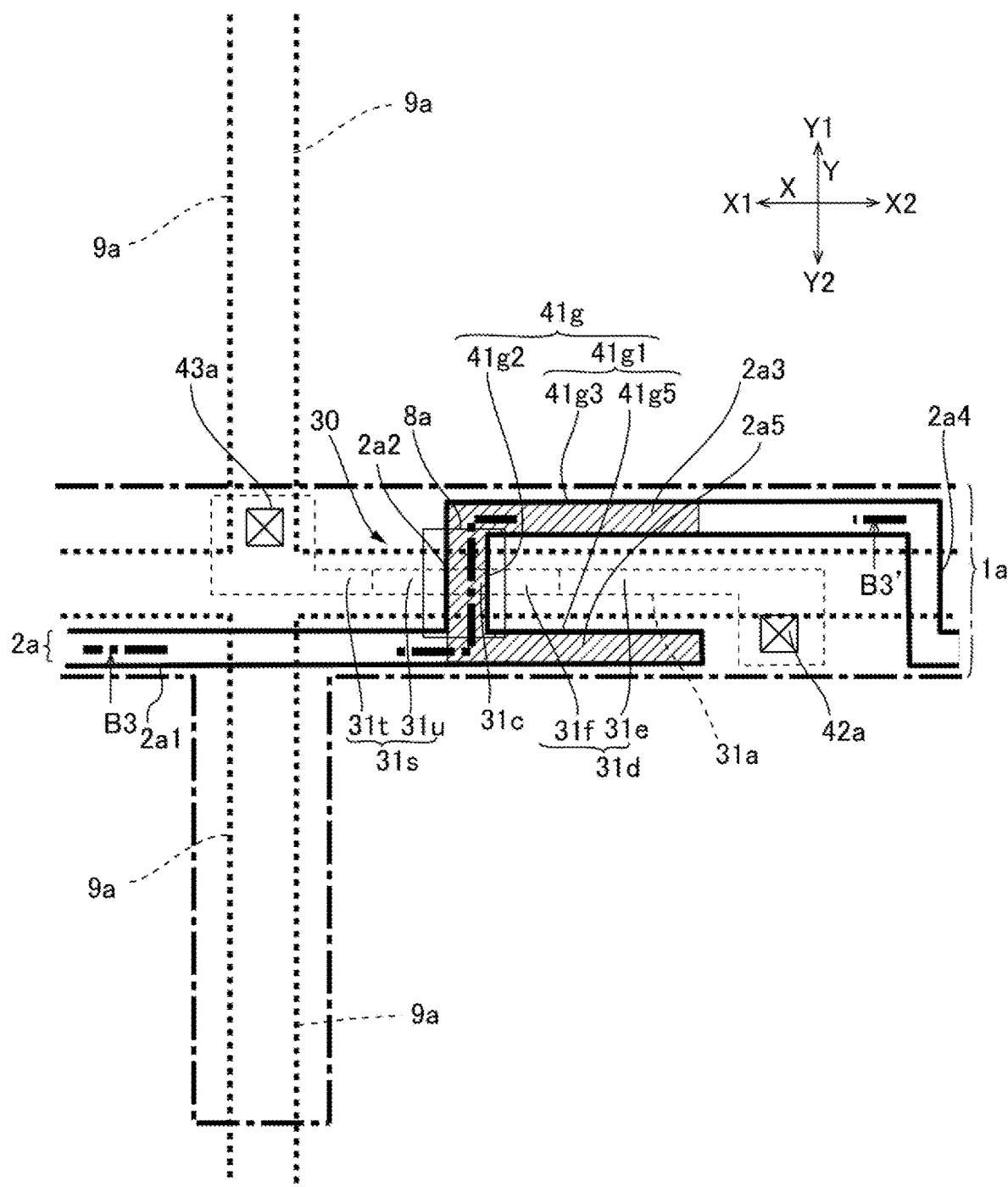
FIG. 13 is a plan view of an electro-optical device according to a third embodiment of the present disclosure.
Figure 14:
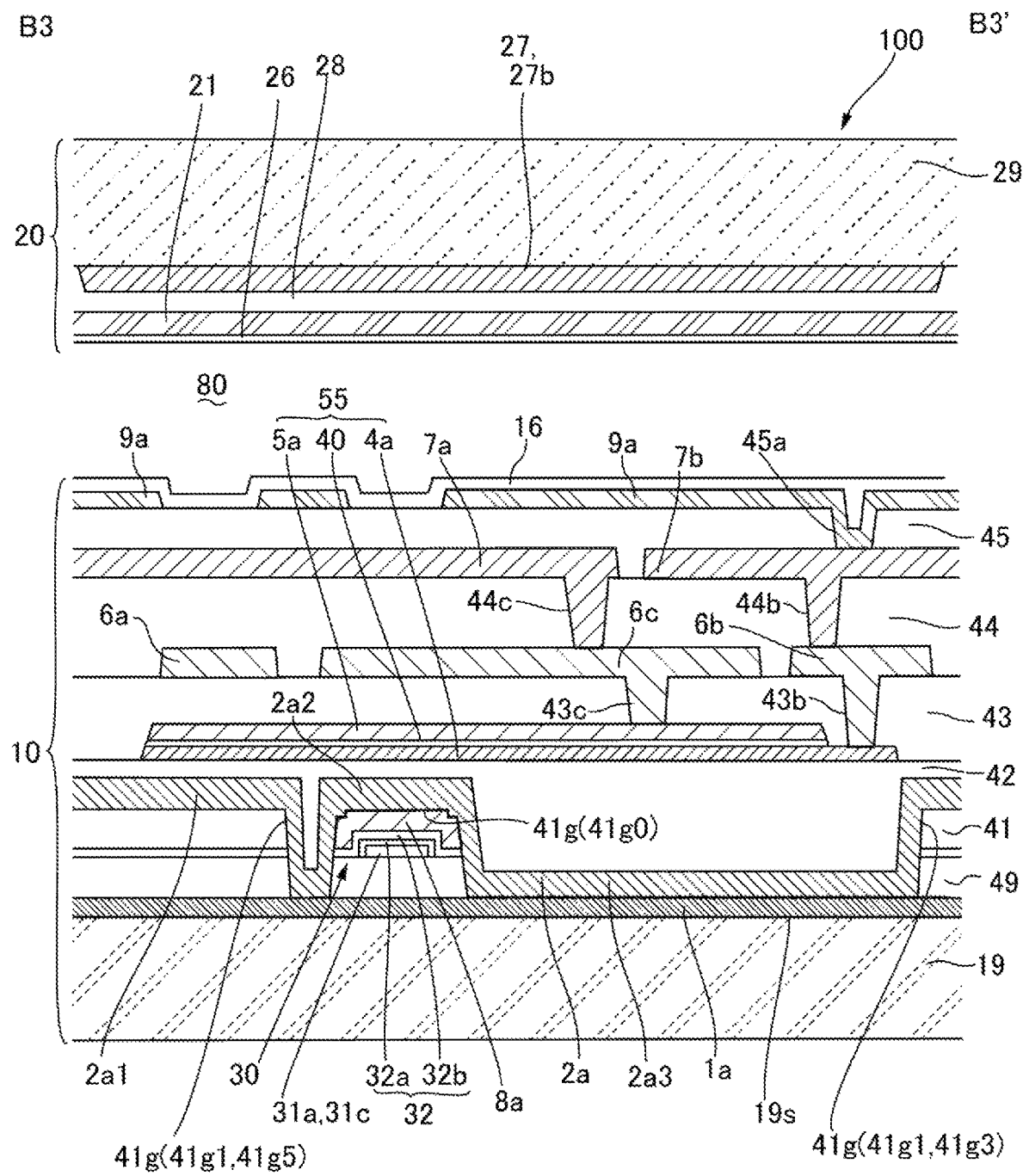
FIG. 14 is a cross-sectional view taken along B3-B3' of FIG. 13.

FIG. 13 is a plan view of an electro-optical device 100 according to a third embodiment of the present disclosure, and illustrates a planar configuration of the first scanning line 1a, the semiconductor film 31a, the gate electrode 8a, the second scanning line 2a, and the like. FIG. 14 is a cross-sectional view taken along B3-B3' in FIG. 13, and schematically illustrates a state in which the electro-optical device 100 is taken along the line B3-B3'. In the first and second embodiments, the entire second scanning line 2a is provided within the groove 41g. However, in this embodiment, the second portion 2a2, the third portion 2a3, and the fifth portion 2a5 of the second scanning line 2a are provided within the groove 41g, and the first portion 2a1 and the fourth portion 2a4 are formed between the inter-layer insulating film 41 and the inter-layer insulating film 42, as illustrated in FIGS. 13 and 14. Such a configuration can be achieved by forming the groove 41g, forming a conductive film having a light shielding property, and applying etching using a photolithography technique to perform patterning to the conductive film to obtain the second scanning line 2a. In this embodiment, the second scanning line 2a is made of aluminum. The rest of the configuration is similar to that in the first embodiment.

The electro-optical device 100 configured as described above also provides, for example, an effect of being able to achieve both multilayering of scanning lines and suppression of the optical leakage current at the same time, as with the electro-optical device 100 according to the first embodiment.

Fourth Embodiment

Figure 15:
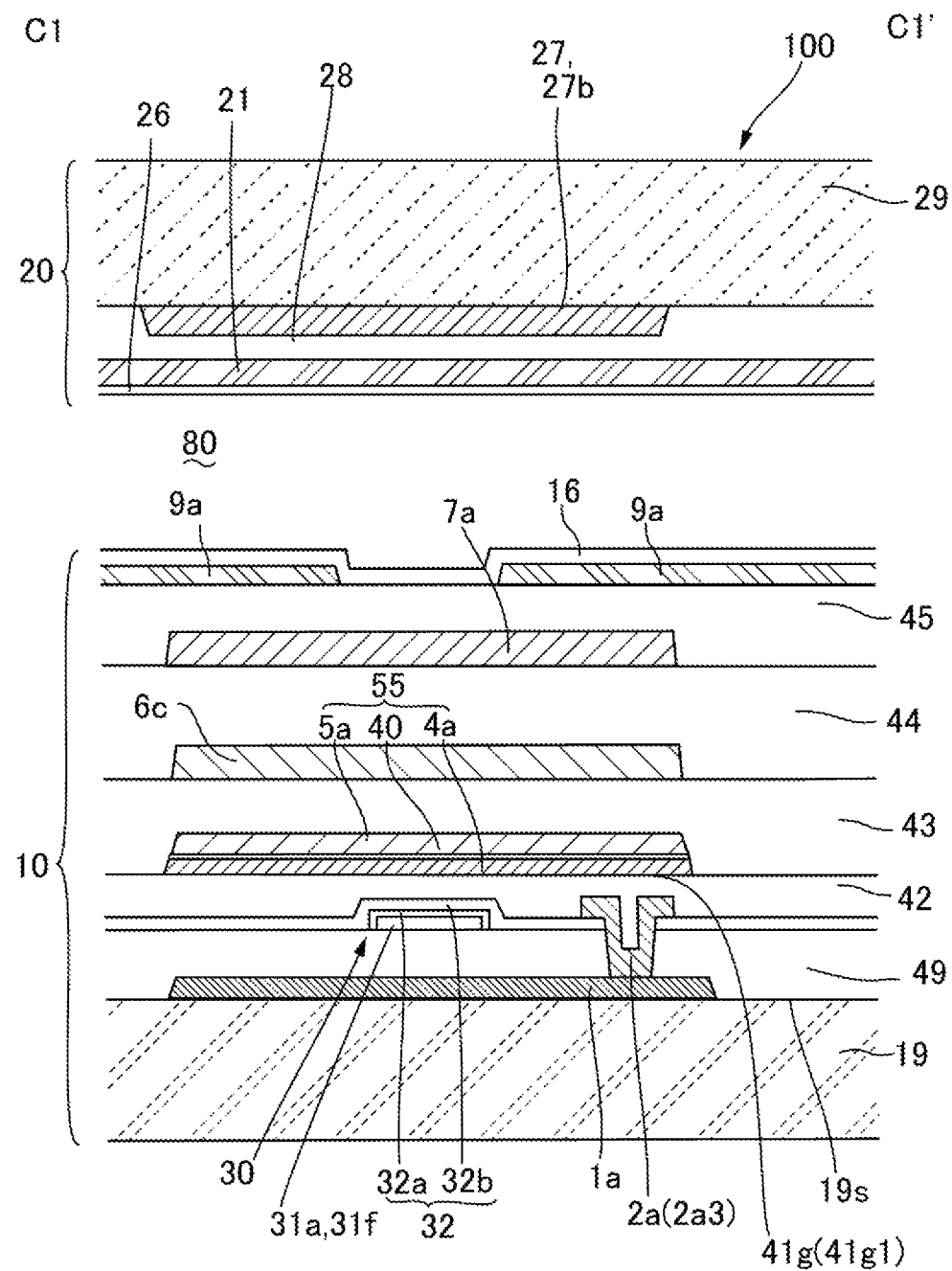
FIG. 15 is an explanatory diagram illustrating an electro-optical device according to a fourth embodiment of the present disclosure.

FIG. 15 is an explanatory diagram of an electro-optical device 100 according to a fourth embodiment of the present disclosure, and corresponds to the cross-sectional view taken along C1-C1' in FIG. 7 that has been referred to in the first embodiment. In the first, second, and third embodiments, a portion of or all of the second scanning line 2a is provided within the groove 41g formed by applying etching to the inter-layer insulating film 41. In contrast, in this embodiment, as illustrated in FIG. 15, the inter-layer insulating film 41 is not provided. After the gate electrode 8a is formed, etching is applied to the inter-layer insulating film 49 to form the second contact portion 41g1 extending through the inter-layer insulating film 49. In addition, after the second contact portion 41g1 is formed, a conductive film having a light shielding property is formed. Then, etching is applied using a photolithography technique to perform patterning to the conductive film to obtain the second scanning line 2a, thereby achieving this embodiment. Thus, in this embodiment, of the inter-layer insulating films 49, 42, 43, 44, and 45, the inter-layer insulating film 49 serves as the "first inter-layer insulating film" according to the present disclosure; the inter-layer insulating film 42 serves as the "second inter-layer insulating film" according to the present disclosure; and the gate insulating film 32 and a portion of the gate electrode 8a are covered with the inter-layer insulating film 42. Thus, the second contact portion 41g1 extends through the inter-layer insulating film 49 serving as the first inter-layer insulating film. In addition, the second scanning line 2a extends between the inter-layer insulating film 49 serving as the first inter-layer insulating film and the inter-layer insulating film 42 serving as the second inter-layer insulating film. The rest of the configuration is similar to that in the first embodiment.

The electro-optical device 100 configured as described above also provides, for example, an effect of being able to achieve both multilayering of scanning lines and suppression of the optical leakage current at the same time, as with the electro-optical device 100 according to the first embodiment.

Fifth Embodiment

Figure 16:
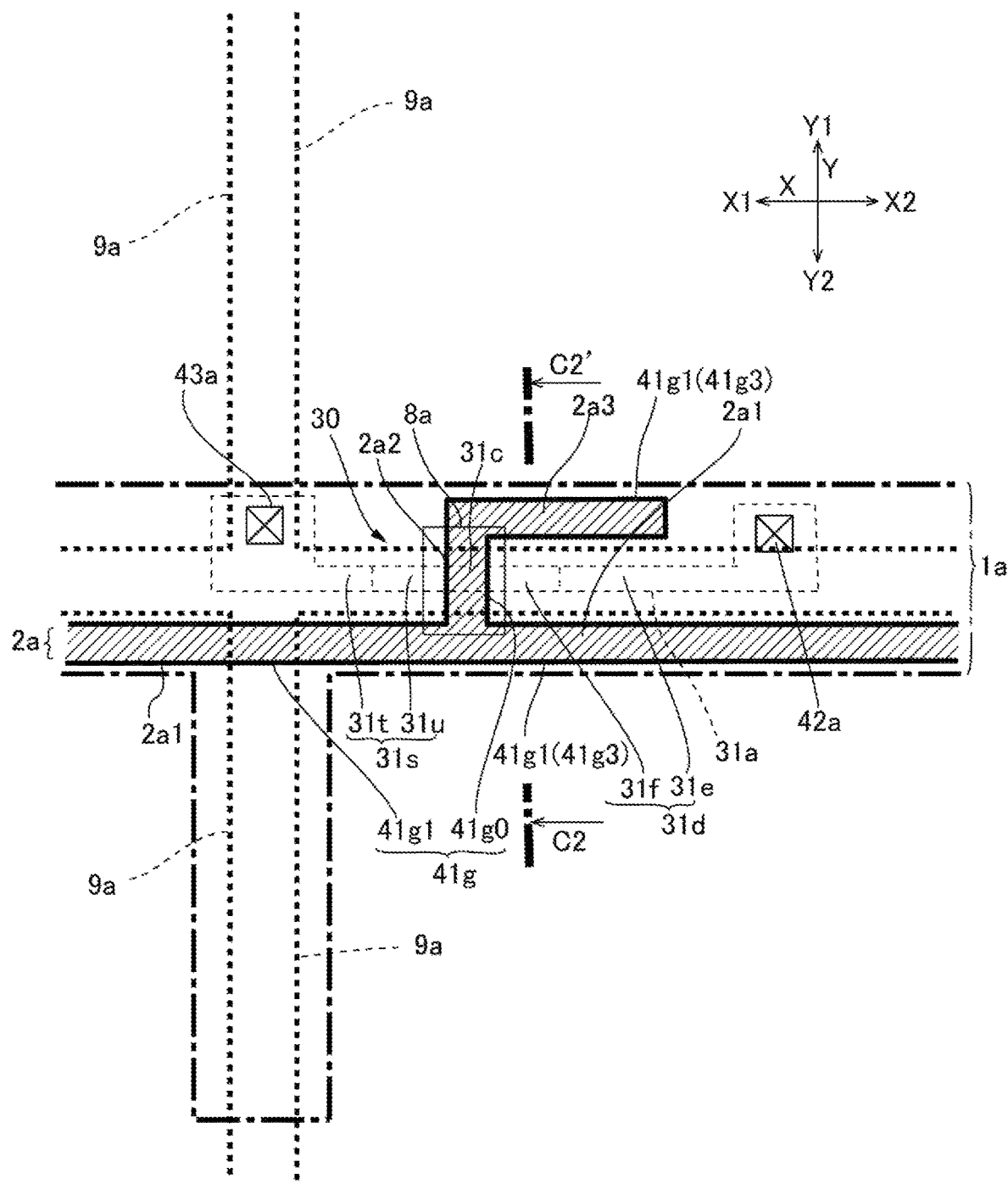
FIG. 16 is an explanatory diagram illustrating an electro-optical device according to a fifth embodiment of the present disclosure.

FIG. 16 is an explanatory diagram of an electro-optical device 100 according to a fifth embodiment of the present disclosure. FIG. 16 illustrates a planar configuration of the first scanning line 1a, the semiconductor film 31a, the gate electrode 8a, the second scanning line 2a, and the like of the electro-optical device according to the fifth embodiment of the present disclosure. In the first embodiment, the end portion of the second region 31e at the other side X2 in the first direction X bends toward the other side Y2 in the second direction Y. In addition, the end portion of the first region 31t at the one side X1 in the first direction X bends toward the one side Y1 in the second direction Y. In contrast, in this embodiment, as illustrated in FIG. 16, the end portion of the second region 31e at the other side X2 in the first direction X as well as the end portion of the first region 31t at the one side X1 in the first direction X bend toward the same direction in the second direction Y. More specifically, the end portion of the second region 31e at the other side X2 in the first direction X and the end portion of the first region 31t at the one side X1 in the first direction X both bend toward the one side Y1 in the second direction Y. Thus, in this embodiment, the first portion 2a1 of the second scanning line 2a is configured to extend in the first direction X at a side of the semiconductor film 31a, this side being at the other side Y2 in the second direction Y. In addition, the second scanning line 2a includes a second portion 2a2 overlapping with the semiconductor film 31a through the gate electrode 8a, and also includes a third portion 2a3 extending at a side of the second low-concentration region 31f of the semiconductor film 31a, this side being at the one side Y1 in the second direction Y. The rest of the configuration is similar to that in the first embodiment.

The electro-optical device 100 configured as described above also provides, for example, an effect of being able to achieve both multilayering of scanning lines and suppression of the optical leakage current at the same time, as with the electro-optical device 100 according to the first embodiment.

Sixth Embodiment

Figure 17:
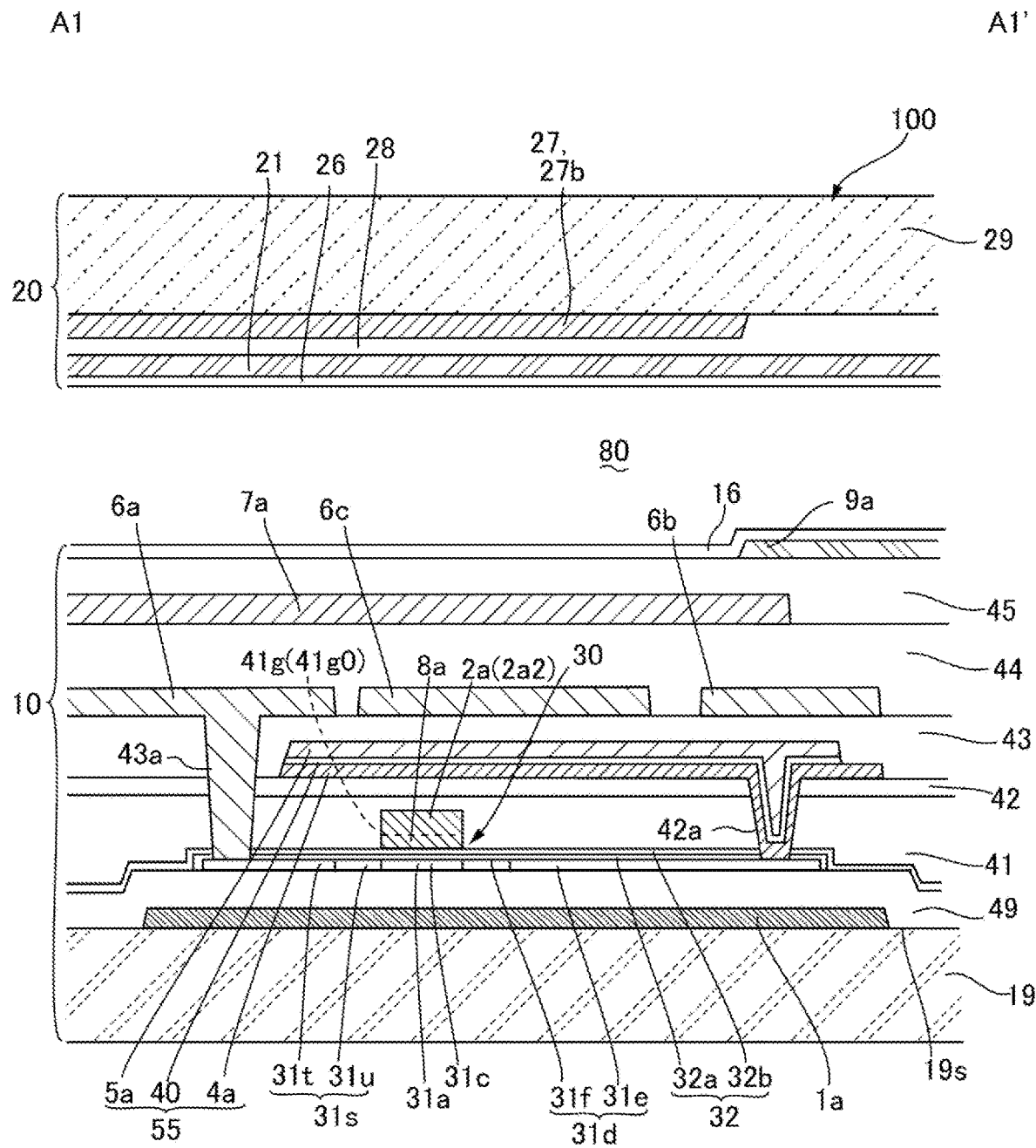
FIG. 17 is an explanatory diagram illustrating an electro-optical device according to a sixth embodiment of the present disclosure.

FIG. 17 is an explanatory diagram of an electro-optical device 100 according to a sixth embodiment of the present disclosure, and corresponds to a cross section taken along A1-A1' in FIG. 5 that has been referred to in the first embodiment. In the embodiments described above, the gate electrode 8a and the second scanning line 2a are comprised of different conductive films. In contrast, in this embodiment, as illustrated in FIG. 17, the gate electrode 8a and the second scanning line 2a are comprised of the same conductive film. That is, at a portion that overlaps with the semiconductor film 31a, the gate electrode 8a is configured with a portion located at a side of the semiconductor film 31a and in a thickness direction of the second scanning line 2a. A midway portion in the thickness direction of the second scanning line 2a corresponds to the first contact portion 41g0 that electrically couples the gate electrode 8a and the second scanning line 2a. In other words, the conductive film that constitutes the gate electrode 8a extends in the first direction X, and constitutes the second scanning line 2a. The rest of the configuration is similar to that in the first embodiment.

The electro-optical device 100 configured as described above also provides, for example, an effect of being able to achieve both multilayering of scanning lines and suppression of the optical leakage current at the same time, as with the electro-optical device 100 according to the first embodiment.

Other Embodiments

In the embodiments described above, a light shielding member that overlaps, in plan view, with the semiconductor film 31a from a side of the pixel electrode 9a is comprised of the relay electrode 6c and the capacitance line 7a. However, the light shielding member that overlaps, in plan view, with the semiconductor film 31a from a side of the pixel electrode 9a may be comprised of only either one of the relay electrode 6c and the capacitance line 7a. In addition, at least either one of the first capacitance electrode 4a and the second capacitance electrode 5a may be set as an electrode having a light shielding property, and the light shielding member that overlaps, in plan view, with the semiconductor film 31a from a side of the pixel electrode 9a may be comprised of this electrode having a light shielding property.

In the embodiments described above, both of the third contact portion 42a and the fourth contact portion 43a overlap with the first scanning line 1a in plan view. However, the present disclosure may be applied to a case where, of the third contact portion 42a and the fourth contact portion 43a, only the third contact portion 42a overlaps with the first scanning line 1a in plan view. In addition, in the embodiments described above, a contact hole that electrically couples the pixel electrode 9a and the semiconductor film 31a is set as the third contact portion 42a, and a contact hole that electrically couples the data line 6a and the semiconductor film 31a is set as the fourth contact portion 43a. However, a contact hole that electrically couples the pixel electrode 9a and the semiconductor film 31a may be set as a third contact portion, and a contact hole that electrically couples the data line 6a and the semiconductor film 31a may be set as a fourth contact portion.

The embodiments have been described using, as an example, the electro-optical device 100 that light source light enters from the side of the second substrate 20. However, the present disclosure may be applied to an electro-optical device 100 that light source light enters from the side of the first substrate 10. In addition, the embodiments described above give, as an example, a case where the electro-optical device 100 is a transmission-type liquid crystal device. However, the present disclosure may be applied to a case where the electro-optical device 100 is a reflective liquid crystal device. Furthermore, the present disclosure may be applied to a case where the electro-optical device 100 is an organic electro luminescence display device.

Example of Installation to Electronic Device

Figure 18:
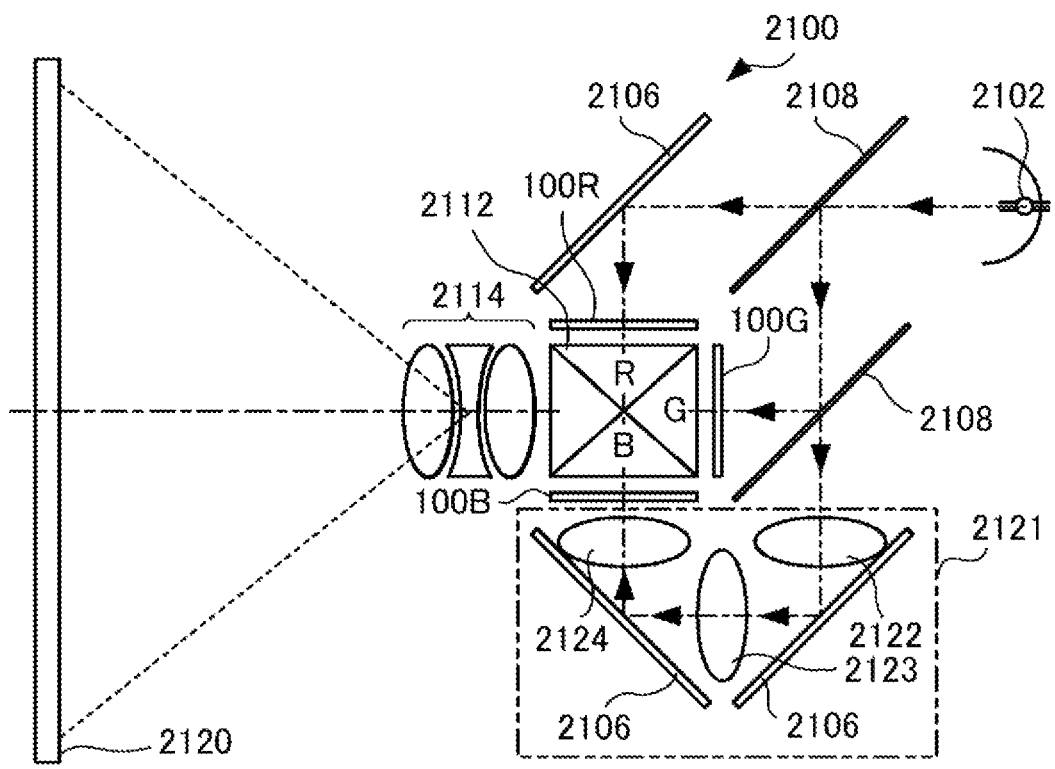
FIG. 18 is a schematic view illustrating a configuration of a projection-type display device using an electro-optical device to which the present disclosure is applied.

An electronic device using the electro-optical device 100 according to the embodiments described above will be described. FIG. 18 is a schematic view illustrating a configuration of a projection-type display device using the electro-optical device 100 to which the present disclosure is applied. In FIG. 18, illustration of an optical element such as a polarizing plate is not given. A projection-type display device 2100 illustrated in FIG. 18 is one example of the electronic device using the electro-optical device 100. In the projection-type display device 2100, the electro-optical device 100 is used as a light valve, and displaying can be performed in a highly precise and bright manner without increasing the size of the device. As illustrated in this drawing, a light source unit 2102 including a lamp unit or the like having a white light source such as a halogen lamp is provided within the projection-type display device 2100. Projection light emitted from the light source unit 2102 is separated into three primary colors of red (R) color, green (G) color, and blue (B) color by three mirrors 2106 and two dichroic mirrors 2108 disposed inside. Each piece of the separated projection light is guided to each of the light valves 100R, 100G, and 100B corresponding to respective primary colors, and is modulated. Note that the B-color light has an optical path longer than those of the other R-color and G-color. Thus, in order to prevent a loss of the light, the B-color light is guided through a relay lens system 2121 including an incidence lens 2122, a relay lens 2123, and an exit lens 2124.

The light modulated by each of the light valves 100R, 100G, and 100B enters the dichroic prims 2112 from three directions. Then, at the dichroic prism 2112, light of R-color and light of B-color are reflected at 90 degrees, and light of G-color passes through. Thus, after images of individual primary colors are combined, a color image is projected onto a screen 2120 by the projection optical system 2114.

Other Projection-Type Display Devices

Note that the projection-type display device may be configured such that an LED light source or the like that emits light of each color is used as a light source unit, and the pieces of color light emitted from the LED light source are each supplied to another liquid crystal device.

Other Electronic Devices

The electronic device including the electro-optical device 100 to which the present disclosure is applied is not limited to the projection-type display device 2100 according to the embodiments described above. Examples of the electronic device may include a projection-type head up display (HUD), a direct-view-type head mounted display, a personal computer, a digital still camera, and a liquid crystal television.

What is claimed is:

1. An electro-optical device comprising:
    a substrate body;
    a pixel electrode;
    a first scanning line having a light shielding property and extending in a first direction in a layer between the substrate body and the pixel electrode;
    a transistor including a semiconductor film and a gate electrode, wherein the semiconductor film extends in the first direction so as to overlap, in a plan view, with the first scanning line in a layer between the first scanning line and the pixel electrode, and the gate electrode overlaps with the semiconductor film from a side of the pixel electrode with a gate insulating film being interposed between the gate electrode and the semiconductor film;
    a data line extending in a second direction intersecting the first direction in a layer between the gate electrode and the pixel electrode;
    a first contact portion overlapping with the gate electrode in the plan view;
    a second contact portion overlapping with the first scanning line in the plan view and including a portion extending along the semiconductor film in the first direction, the portion extending at a side of the semiconductor film;
    a third contact portion electrically coupling the semiconductor film and one of the data line and the pixel electrode at a position that overlaps with the first scanning line in the plan view; and
    a second scanning line having a light shielding property, wherein the second scanning line extends, in the first direction, through a position spaced apart from the third contact portion in the second direction in a layer between the gate electrode and the pixel electrode, the second scanning line overlaps with the first scanning line in the plan view, the second scanning line is electrically coupled to the gate electrode at the first contact portion, and the second scanning line is electrically coupled to the first scanning line at the second contact portion.

2. The electro-optical device according to claim 1, wherein
    the semiconductor film includes:
        a channel region that overlaps with the gate electrode in the plan view;
        a first region that is spaced apart from the channel region toward one side in the first direction and is electrically coupled to the data line;
        a first low-concentration region provided between the channel region and the first region and having a concentration of impurity lower than the first region;
        a second region that is spaced apart from the channel region toward another side in the first direction and is electrically coupled to the pixel electrode; and
        a second low-concentration region provided between the channel region and the second region and having a concentration of impurity lower than the second region, and
    the second contact portion includes a portion extending along the second low-concentration region on at least one side of both sides of the semiconductor film.

3. The electro-optical device according to claim 2, wherein
    the second contact portion includes a portion that extends along the second low-concentration region and on both sides of the semiconductor film.

4. The electro-optical device according to claim 1, wherein
    the second scanning line extends so as to intersect the semiconductor film at the first contact portion with the gate electrode being interposed between the second scanning line and the semiconductor film.

5. The electro-optical device according to claim 1, comprising:
    a fourth contact portion electrically coupling the semiconductor film and the other one of the data line and the pixel electrode at a position that overlaps with the first scanning line in the plan view, wherein
    the second scanning line extends, in the first direction, through a position spaced apart in the second direction from the third contact portion and the fourth contact portion.

6. The electro-optical device according to claim 1, wherein
    the first contact portion and the second contact portion are coupled in the plan view.

7. The electro-optical device according to claim 1, wherein
    a capacitance element that overlaps with the semiconductor film in the plan view is provided in a layer between the second scanning line and the pixel electrode.

8. The electro-optical device according to claim 1, wherein
    a light shielding member that overlaps with the semiconductor film in the plan view is provided in a layer between the second scanning line and the pixel electrode.

9. The electro-optical device according to claim 1, comprising:
    a first inter-layer insulating film provided in a layer between the first scanning line and the semiconductor film;
    a second inter-layer insulating film covering the gate electrode and the gate insulating film; and
    a third inter-layer insulating film covering the second inter-layer insulating film, wherein
    the first contact portion extends through the second inter-layer insulating film, and
    the second contact portion extends through the first inter-layer insulating film and the second inter-layer insulating film.

10. The electro-optical device according to claim 9, wherein a groove is formed, the groove extending so as to overlap with the first scanning line in the plan view and constituting the first contact portion and the second contact portion, and the second scanning line is formed covering an inner wall of the groove.

11. The electro-optical device according to claim 10, wherein
the groove is entirely continuous corresponding to the first scanning line.

12. The electro-optical device according to claim 8, comprising:
a first inter-layer insulating film provided in a layer between the first scanning line and the semiconductor film; and
a second inter-layer insulating film covering the gate electrode and the gate insulating film, wherein
the second contact portion extends through the first inter-layer insulating film, and
the second scanning line extends between the first inter-layer insulating film and the second inter-layer insulating film.

13. An electronic device comprising the electro-optical device according to claim 1.

14. An electro-optical device comprising:
a substrate;
a first scanning line extending in a first direction above the substrate;
a transistor being positioned above the first scanning line and including a semiconductor film and a gate electrode, the semiconductor film extending in the first direction so as to overlap with the first scanning line in a plan view;
a first contact portion overlapping with the gate electrode in the plan view;
a second contact portion overlapping with the first scanning line in the plan view;
a second scanning line extending, in the first direction, and overlapping with the first scanning line in the plan view, the second scanning line being electrically coupled to the gate electrode at the first contact portion, and electrically coupled to the first scanning line at the second contact portion; and
a third contact portion overlapping with the first scanning line in the plan view, wherein
the second contact portion extends along the semiconductor film in the first direction at a side of the semiconductor film, wherein
the third contact portion extends along the semiconductor film in the first direction at opposite side of the semiconductor film.

15. The electro-optical device according to claim 14, wherein
A>B, wherein
A is a first width of the first scanning line in a second direction intersecting the first direction, and
B is a second width of the second scanning line in the second direction.

16. The electro-optical device according to claim 14, wherein
a part of the second contact portion is extending along the first direction.

17. The electro-optical device according to claim 14, further comprising:
a data line extending in a second direction intersecting the first direction; and
a third contact portion electrically coupling the semiconductor film and the data line.

18. The electro-optical device according to claim 14, wherein
a connecting portion extends in a second direction, and connects the first contact portion, the second contact portion and the third contact portion.

19. An electronic device comprising the electro-optical device according to claim 14.

* * * * *